(12) United States Patent
Emrick et al.

(10) Patent No.: US 9,175,131 B2
(45) Date of Patent: Nov. 3, 2015

(54) DEOXYBENZOIN-DERIVED ANTI-FLAMMABLE POLYMERS

(71) Applicant: University of Massachusetts, Boston, MA (US)

(72) Inventors: Todd Emrick, South Deerfield, MA (US); E. Bryan Coughlin, Amherst, MA (US); Thangamani Ranganathan, San Jose, CA (US); Michael Beaulieu, Chicopee, MA (US); Richard Farris, Leeds, MA (US); Bon-Cheol Ku, Wanju-gun (KR)

(73) Assignee: University of Massachusetts, Boston, MA (US)

( * ) Notice: Subject to any disclaimer, the term of this patent is extended or adjusted under 35 U.S.C. 154(b) by 205 days.

(21) Appl. No.: 13/655,123

(22) Filed: Oct. 18, 2012

(65) Prior Publication Data

US 2013/0102754 A1  Apr. 25, 2013

Related U.S. Application Data

(62) Division of application No. 12/934,386, filed as application No. PCT/US2009/038789 on Mar. 30, 2009, now Pat. No. 8,314,202.

(60) Provisional application No. 61/072,517, filed on Mar. 31, 2008, provisional application No. 61/072,515, filed on Mar. 31, 2008, provisional application No. 61/072,516, filed on Mar. 31, 2008.

(51) Int. Cl.
| *C08G 61/04* | (2006.01) |
| *C08F 20/18* | (2006.01) |
| *C08G 18/76* | (2006.01) |
| *C08G 18/77* | (2006.01) |
| *C08G 18/10* | (2006.01) |
| *C08G 18/32* | (2006.01) |
| *C08F 12/22* | (2006.01) |
| *C08F 12/32* | (2006.01) |
| *C08F 212/14* | (2006.01) |
| *C08F 212/32* | (2006.01) |
| *C08G 59/04* | (2006.01) |
| *C08G 59/06* | (2006.01) |
| *C08G 59/50* | (2006.01) |
| *C08G 101/00* | (2006.01) |
| *C08F 220/30* | (2006.01) |

(52) U.S. Cl.
CPC ............... *C08G 61/04* (2013.01); *C08F 12/22* (2013.01); *C08F 12/32* (2013.01); *C08F 20/18* (2013.01); *C08F 212/14* (2013.01); *C08F 212/32* (2013.01); *C08G 18/10* (2013.01); *C08G 18/3215* (2013.01); *C08G 18/7621* (2013.01); *C08G 18/7671* (2013.01); *C08G 18/771* (2013.01); *C08G 59/04* (2013.01); *C08G 59/06* (2013.01); *C08G 59/50* (2013.01); *C08G 59/504* (2013.01); *C08F 2220/302* (2013.01); *C08G 2101/0008* (2013.01)

(58) Field of Classification Search
CPC ...... C08F 212/14; C08F 212/32; C08F 12/22; C08F 12/32; C08F 20/18; C08G 61/04
USPC .......................... 528/125, 206, 220, 361, 425
See application file for complete search history.

(56) References Cited

PUBLICATIONS

Ellzey et al; Macromolecules; 2006, 39, 3553-3558.*

* cited by examiner

*Primary Examiner* — Karuna P Reddy
(74) *Attorney, Agent, or Firm* — Milstein Zhang & Wu LLC

(57) ABSTRACT

The invention provides novel flame-retardant polymers and materials, their synthesis and use. More particularly, the flame-retardant polymers are deoxybenzoin-derived polymers.

6 Claims, 6 Drawing Sheets

18  19  20

Polyurethane foams, 18-20 (bottom) and their corresponding char (top)

Photograph of BHDB/BPA Polyarylate Test Bars After ASTM D 3801 (Top of Specimen) and ASTM D 5048 (Bottom of Specimen)

DEOXYBENZOIN-DERIVED ANTI-FLAMMABLE POLYMERS

RELATED APPLICATIONS

This application claims the benefit of priority from U.S. application Ser. No. 12/934,386, filed Dec. 22, 2010, which is the U.S. National Phase of PCT/US2009/038789, filed Mar. 30, 2009, which claims the benefit of priority from U.S. Provisional Application Ser. Nos. 61/072,517; 61/072,515; and 61/072,516, each filed on Mar. 31, 2008, the entire content of each of which is incorporated herein by reference in its entirety.

GOVERNMENT RIGHTS

The United States Government has certain rights to the invention pursuant to Grant No. 60NANB6D6123 from National Institute of Standards and Technology, and Grant No. 99-G-035#008 from Federal Aviation Administration, to the University of Massachusetts.

FIELD OF THE INVENTION

The invention relates to flame retardant polymers. More particularly, the invention relates to deoxybenzoin-derived polymers, and related methods and uses thereof.

BACKGROUND OF THE INVENTION

Polymers are a mainstay of modern society, for example, widely used in fabricating textiles, upholstery, construction materials, various air, land or sea vehicles, and microelectronic devices and appliances. The inherent flammability of many polymers poses a significant threat, especially in enclosed or isolated spaces. Therefore, as synthetic polymers are used extensively in society as plastics, rubbers, and textiles, polymer flammability has been recognized as a safety hazard and remains an important challenge in polymer research.

Fire or flame retardant (FR) additives may be used to temper polymer flammability. For example, brominated organic compounds comprise a large subset of FRs used today. Flame retardants are incorporated into polymer materials as small molecule additives, or as part of the polymer backbone, to reduce flammability. A number of halogenated molecules, including aromatic and aliphatic brominated compounds, have been employed to reduce polymer flammability. Brominated aromatic flame retardants can be found in a wide-range of products, including computer, textiles, foam furniture, and construction materials.

FR compounds also face legislative scrutiny due to health and environmental concerns, particularly related to bioaccumulation (e.g., polybrominated diphenyl ether (PBDE) has been detected in umbilical cord serum and breast milk). (See, U.S. Senate CPSC Reform Act of 2007 (S.2045) (US Senate Bill 3616); Gomara et al., *Environ Sci Technol* 2007; 41: 6961-6968.); Blum et al., *Science* 1977, 195: 17-23; Gold et al. *Science* 1978; 200: 785-787).

The environmental accumulation of halogenated flame retardants raises concerns that are restricting their use, and requires the development of nonhalogenated alternatives. In addition, some halogenated flame retardants release hydrogen halide gas upon combustion, which is especially undesirable in confined spaces, such as on aircrafts and ships. These concerns have led to an emphasis on non-halogenated flame retardants in recent years. However, non-halogenated flame retardant additives, such as alumina trihydrate, compromise the physical and mechanical properties of polymers when loaded at high levels.

Accordingly, there remains an urgent, on-going need polymers and for a general synthetic strategy toward a broad range of structurally and functionally diverse flame-retardant polymers.

SUMMARY OF THE INVENTION

The invention is based in part on the unexpected discovery of certain novel deoxybenzoin-derived polymers and compositions thereof are unique and possess desirable flame or fire retardant properties. Such unique polymers, which have deoxybenzoin-based backbone or side chains, along with methods for their syntheses and uses thereof have been discovered and are expect to have broad impact on such diverse fields of fabricating textiles, upholstery, construction materials, various air, land or sea vehicles, and microelectronic devices and appliances. These novel polymers address some of the most urgent needs for anti-flammable polymeric materials with much better environmental impact profile than many conventional polymers.

In one aspect, the present invention generally relates to novel dexoybenzoin-derived polymers having a structural repeating unit having the structure of:

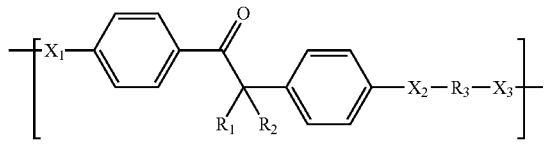

wherein each of $R_1$ and $R_2$ is independently selected from hydrogen, un-substituted or substituted alkyl, aryl, —O-alkyl, —O-aryl groups;

each of $X_1$, $X_2$, and $X_3$ is independently O, —N(R)—, single bond, or —O—$R_4$—; wherein R is hydrogen or an alkyl group, $R_4$ is an unsubstituted or substituted alkylene or arylene; and $R_3$ is selected from an alkylene, arylene, —C(O)—, —$R_5$—C(O)—$R_5$—, —Si($R_6$)($R_7$)—, —$R_8$—S(O)$_2$—$R_8$—, and —C(O)—$X_4$—$R_9$—$X_5$—C(O)— groups;

each of $R_5$, $R_8$, and $R_9$ is an unsubstituted or substituted alkylene or arylene;

each $R_6$ and $R_7$ is independently selected from hydrogen, un-substituted or substituted alkyl groups; and $X_4$ and $X_5$ is independently O, —N(H)—, or a single bond.

For example, each of $R_1$ and $R_2$ is hydrogen. In certain embodiments, each of $X_1$ and $X_2$ is O. In some detailed embodiments, each of $R_1$ and $R_2$ is hydrogen, $X_3$ is O, and $R_3$ is —C(O)—. In certain other embodiments, each of $X_1$ and $X_2$ is —N(H)—. In certain other embodiments, $X_3$ is a single bond.

The polymers of the invention may be a co-polymer. The polymer may be cured with a di- or multi-functional amine. The polymer may be cured with a di- or multi-functional carboxylic acid.

In another aspect, the present invention generally relates to polymers comprising a structural repeating unit having the structure of:

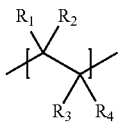

I wherein
each of $R_1$, $R_2$, $R_3$ and $R_4$ is independently selected from hydrogen, un-substituted or substituted alkyl, and aryl groups, provided that at least one of $R_1$, $R_2$, $R_3$ and $R_4$ comprises a deoxybenzoin moiety having the structure of:

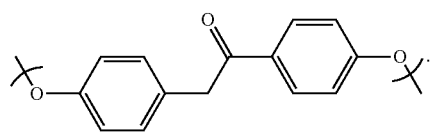

II

In certain embodiments, each of $R_1$, $R_2$, and $R_3$ is independently selected from hydrogen, un-substituted or substituted alkyl, and aryl groups and $R_4$ is

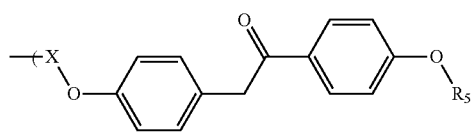

III wherein X is a unsubstituted or substituted bivalent alkyl or aryl group, and $R_5$ is a hydrogen, substituted or un-substituted alkyl or aryl groups.

The polymer may be a co-polymer, for example, further comprises a structural repeating unit having the structure of

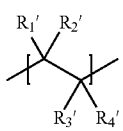

wherein each of $R_1'$, $R_2'$, $R_3'$ and $R_4'$ is independently selected from hydrogen, un-substituted or substituted alkyl, and aryl groups.

In certain embodiments, the polymer includes a structural repeating unit having the structure of:

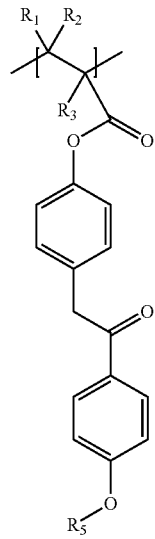

wherein each of $R_1$, $R_2$, $R_3$, and $R_5$ is independently selected from hydrogen, un-substituted or substituted alkyl, and aryl groups.

In certain embodiments, the polymer may include a structural repeating unit having the structure of:

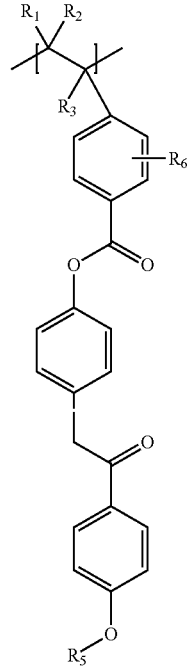

wherein each of $R_1$, $R_2$, $R_3$, and $R_5$ is independently selected from hydrogen, un-substituted or substituted alkyl, and aryl groups, and $R_6$ is a —OH, or substituted or un-substituted alkyl groups.

In certain embodiments, the polymer may include a structural repeating unit having the structure of:

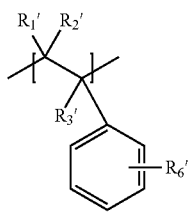

wherein each of $R_1'$, $R_2'$, and $R_3'$ is independently selected from hydrogen, un-substituted or substituted alkyl, and aryl groups, and $R_6'$ is one or more of —OH, or substituted or un-substituted alkyl groups.

Copolymers of the invention include random copolymers, statistical copolymer, block copolymers, graft-block copolymers, star-shaped copolymers, etc.

The present invention also encompasses composite materials that comprises a polymer of the invention. The present invention also encompasses a polymer resin of the polymer of the invention, wherein the polymer resin has heat release capacity (HRC) of less than 200 J/g-K, preferably less than 150 J/g-K, more preferably less than 100 J/g-K. A polymer resin of the polymer may have a char yield of between 20% to 40%, between 25% and 35%, between 30% and 40% and more than 40%.

The invention further encompasses a product comprising a deoxybenzoin-derived polymer of the invention. The deoxybenzoin moiety may be found in the backbone or in the pendant side chain of the polymer.

DEFINITIONS

Figure 1:
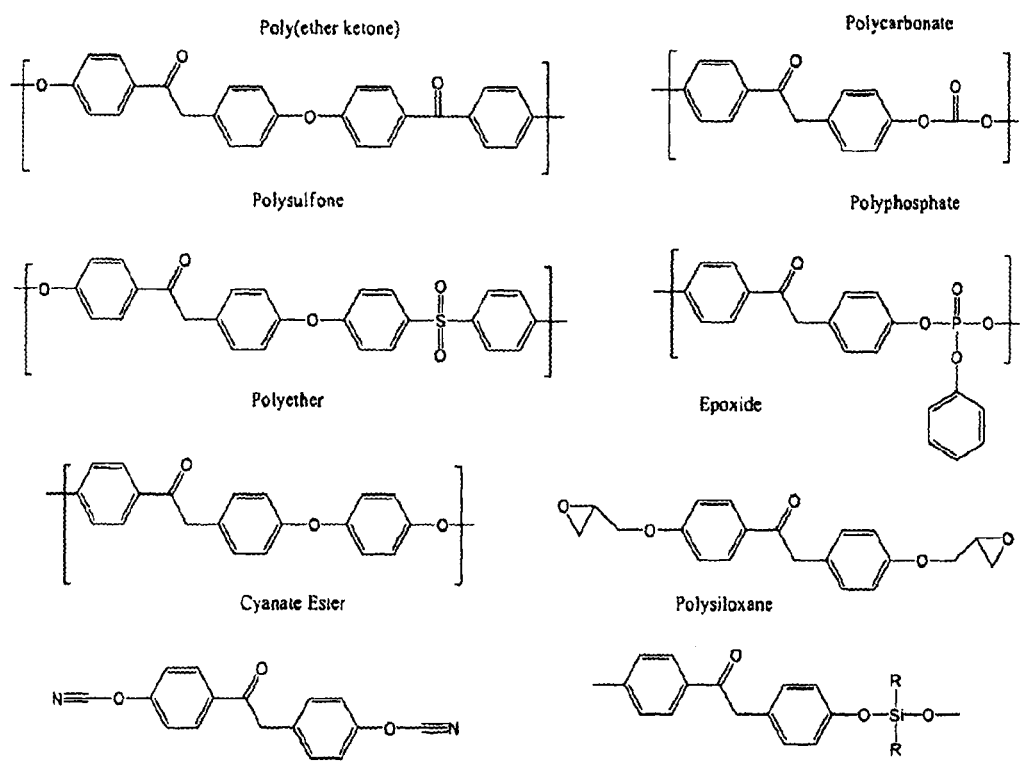
FIG. 1 shows certain exemplary deoxybenzoin-containing polymers.

Definitions of specific functional groups and chemical terms are described in more detail below. General principles of organic chemistry, as well as specific functional moieties and reactivity, are described in "Organic Chemistry", Thomas Sorrell, University Science Books, Sausalito: 1999.

Certain compounds of the present invention may exist in particular geometric or stereoisomeric forms. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

Given the benefit of this disclosure, one of ordinary skill in the art will appreciate that synthetic methods, as described herein, utilize a variety of protecting groups. By the term "protecting group", as used herein, it is meant that a particular functional moiety, e.g., O, S, or N, is temporarily blocked so that a reaction can be carried out selectively at another reactive site in a multifunctional compound. In preferred embodiments, a protecting group reacts selectively in good yield to give a protected substrate that is stable to the projected reactions; the protecting group should be selectively removable in good yield by readily available, preferably non-toxic reagents that do not attack the other functional groups; the protecting group forms an easily separable derivative (more preferably without the generation of new stereogenic centers); and the protecting group has a minimum of additional functionality to avoid further sites of reaction. Oxygen, sulfur, nitrogen, and carbon protecting groups may be utilized. Examples of a variety of protecting groups can be found in *Protective Groups in Organic Synthesis*, Third Ed. Greene, T. W. and Wuts, P. G., Eds., John Wiley & Sons, New York: 1999.

It will be appreciated that the compounds, as described herein, may be substituted with any number of substituents or functional moieties.

The term "alkyl", as used herein, refers to a saturated linear or branched (including cyclic) hydrocarbon free radical, unsubstituted (i.e., with corresponding number of carbon and hydrogen atoms), or optionally substituted with substituents known to those skilled in the art. For example, alkyl groups include $(C_1-C_6)$alkyl (or $C_1-C_6$ alkyl), which refers to a saturated linear or branched free radical consisting essentially of 1 to 6 carbon atoms (i.e., 1, 2, 3, 4, 5, or 6 carbon atoms) and a corresponding number of hydrogen atoms. Exemplary $(C_1-C_6)$alkyl groups include methyl, ethyl, n-propyl, isopropyl, n-butyl, isobutyl, etc. Of course, other $(C_1-C_6)$alkyl groups will be readily apparent to those of skill in the art given the benefit of the present disclosure.

In general, the terms "aryl" and "heteroaryl", as used herein, refer to stable mono- or polycyclic, heterocyclic, polycyclic, and polyheterocyclic unsaturated moieties having preferably 3-14 carbon atoms, each of which may be substituted or unsubstituted. Substituents include, but are not limited to, any of the previously mentioned substitutents, i.e., the substituents recited for aliphatic moieties, or for other moieties as disclosed herein, resulting in the formation of a stable compound. In certain embodiments of the present invention, "aryl" refers to a mono- or bicyclic carbocyclic ring system having one or two aromatic rings including, but not limited to, phenyl, naphthyl, tetrahydronaphthyl, indanyl, indenyl, and the like. In certain embodiments of the present invention, the term "heteroaryl", as used herein, refers to a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

DETAILED DESCRIPTION OF THE INVENTION

Novel deoxybenzoin-derived polymers and compositions thereof that possess desirable flame or fire retardant properties have been unexpectedly discovered. Such unique polymers, which have deoxybenzoin-based backbone or side chains, are expect to have broad impact and address some of the most urgent needs for anti-flammable polymeric materials with much better environmental impact profile than many conventional polymers.

a. Low-Flammable Polymers

Low-flammable polymers are desired that are halogen-free and possess high thermal stability, low heat of combustion, and a low combustion hear release capacity (HRC), with minimal release of toxic fumes. Intrinsically fire-resistant polymers that undergo significant carbonization upon heating are highly desirable, as carbonaceous char formation effectively averts combustion by producing an insulating layer on the polymer surface. Such char formation may also be realized from composite materials in which an additive assists in generating the desired char.

The HRC of a material has been identified as a key characteristic of polymer flammability. Several calorimetry methods are available for measuring HRC during combustion, but these methods require relatively large sample quantities (~100 g per experiment) and the results obtained depend on several factors including ignition source, ventilation, sample thickness, orientation, and edge characteristics. Pyrolysis combustion flow calorimetry (PCFC) was developed as a method to evaluate polymer flammability on milligram quantities. (See, Lyon et al., *J. Anal. Appl. Pyrolysis* 2004, 71, 27.) PCFC measures the heat of combustion of the fuel gases that are released by the pyrolysis of a solid in an inert gas stream. The fuel gases then mix with the excess oxygen and completely oxidize at high temperature. The instantaneous heat of combustion of the flowing gas stream is then measured by oxygen consumption calorimetry. HRC, defined as the maximum amount of heat released per unit mass per degree Kelvin (J/g-K), is viewed as an inherent material property and a reliable predictor of polymer flammability. HRC values obtained by PCFC, across a range of many polymer types, are found to scale with the larger, conventional bench-scale flammability experiments.

Aromatic polyesters prepared from bisphenols and phthalic acids are examples of high performance engineering thermoplastics. Conventional bisphenol A (BPA)-based polyacrylates are widely used, but exhibit higher-than-desired flammability (e.g., BPA-polyarylates have HRC ~400 J/g-K). Polyarylates containing 1,1-dichloro-2,2-bis(4-hydroxyphenyl)ethylene (bisphenol C, or BPC) are transparent and processable, and exhibit excellent mechanical and dielectric properties. BPC-based polymers are well within the "ultra fire-resistant" category (HRC <100 J/g-K). With BPC-based polymers, the evolution of hydrogen chloride gas at elevated temperatures, is concerning and may limit ultimate scale-up and manufacturing efforts.

BPC derivatives can be converted into the corresponding diphenylacetylene by loss of the chlorines, followed by phenyl migration. In BPC-containing polymers, this rearrangement mechanism leads to char formation, and the presence of halogen serves primarily to setup this rearrangement. In fact, diphenylacetylene-containing poly(arylether ketone)s showed heat release characteristics of similar magnitude to the corresponding BPC-versions. However, these alkyne-containing aromatic polymers are prone to side-reactions and crosslinking even at moderately high temperatures, and have less-than-optimal processability and mechanical properties typically desired in polymer materials.

Representing another approach towards non-halogenated anti-flammable polymers is through the integration of a deoxybenzoin moiety, e.g., 4,4'-bishydroxydeoxybenzoin (BHDB), as a bisphenolic monomer. Polymers derived from BHDB exhibit low combustion heat release rates and total heat of combustion. The desirable heat release properties associated with DHBD-containing polymers are believed to arise from the thermally-induced conversion of BHDB to diphenylacetylene moieties that char by aromatization. (See, Ellzey, et al., *Macromolecules* 2006, 39, 3553). Although PCFC revealed low HRC values for the BHBD-polyarylates, the rather low solubility of such polyarylate compounds limits their molecular weight and processability. As expected, when bisphenol A (BPA) and BHDB were used as co-biophenols in the polyarylate synthesis, the solubility increased with BPA content, but so did the flammability.

Recently, the first use of 4,4'-bishydroxydeoxybenzoin (BHDB) as an $A_2$ monomer in polycondensation chemistry, and through calorimetric methods identified exceedingly low heat release properties of these BHDB-containing polymers. Ellzey et al. *Macromolecules* 2006; 39: 3553-3558; Ranganathana et al. *Macromolecules* 2006; 39: 5974-5975. BHDB can be viewed as a drop-in replacement for bisphenol A (BPA), a classic $A_2$ monomer for polycondensation that has been integrated into a wide range of commercial polymer products. BPA-based polymers, while not nearly as flammable as polyethylene or polystyrene, are moderately flammable and thus used in conjunction with FR additives. Bisphenol C (BPC)-based polymers are attractive for their charring decomposition that insulates the polymer-air interface, and precludes the evolution of gaseous decomposition products required for sustained combustion. However, a general concern over the chlorine content of BPC has slowed (or precluded) commercialization of BPC-containing polymers.

In one aspect, the present invention generally relates to novel dexoybenzoin-derived polymers having a structural repeating unit having the structure of:

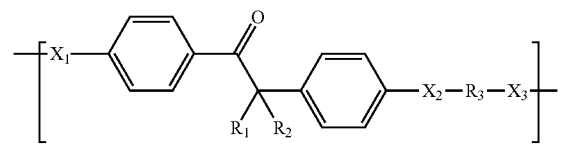

wherein each of $R_1$ and $R_2$ is independently selected from hydrogen, un-substituted or substituted alkyl, aryl, —O-alkyl, —O-aryl groups;

each of $X_1$, $X_2$, and $X_3$ is independently O, —N(R)—, single bond, or —O—$R_4$—; wherein R is hydrogen or an alkyl group, $R_4$ is an unsubstituted or substituted alkylene or arylene; and $R_3$ is selected from an alkylene, arylene, —C(O)—, —$R_5$—C(O)—$R_5$—, —Si($R_6$)($R_7$)—, —$R_8$—S(O)$_2$—$R_8$—, and —C(O)—$X_4$—$R_9$—$X_5$—C(O)— groups;

each of $R_5$, $R_8$, and $R_9$ is an unsubstituted or substituted alkylene or arylene; each $R_6$ and $R_7$ is independently selected from hydrogen, un-substituted or substituted alkyl groups; and $X_4$ and $X_5$ is independently O, —N(H)—, or a single bond.

In certain embodiments, each of $R_1$ and $R_2$, is hydrogen. In certain embodiments, each of $X_1$ and $X_2$ is O. In some detailed embodiments, each of $R_1$ and $R_2$ is hydrogen, $X_3$ is O, and $R_3$ is —C(O)—.

In certain other embodiments, each of $X_1$ and $X_2$ is —N(H)—. In certain other embodiments, $X_3$ is a single bond.

The polymers of the invention 1 may be a co-polymer. The polymer may be cured with a di- or multi-functional amine. The polymer may be cured with a di- or multi-functional carboxylic acid.

Exemplary and non-limiting polymers where deoxybenzoin moieties are incorporated into the backbone structure are listed in FIG. 1. For instance, poly(ether ketone)s can be prepared by the polycondensation of t-butyldimethylsilyl (TBDMS)-protected BHDB with 4,4'-difluorobenzophenone using cesium fluoride catalyst in N-methylpyrrolidone solvent at 150° C. Likewise, using known literature polymerization techniques, polysulfones can be prepared by the condensation of BHDB with 4,4'-dichlorodiphenyl sulfone using a base as catalyst.

Polyphosphates can be synthesized either by interfacial or solution polymerization of BHDB with phenyl dichlorophosphate, and polyethers can be prepared by the reaction of BHDB with 1,4-dibromobenzene using a basic catalyst such as potassium carbonate. Corresponding polysiloxanes can be synthesized by condensing BHDB with disubstituted dichlorosilanes (aliphatic or aromatic).

Polycarbonates can be prepared by one of several methods, including: (a) interfacial polycondensation of BHDB with phosgene or triphosgene; (b) solution polycondensation of BHDB with phosgene or triphosgene; and (c) melt polymerization of BHDB with diphenyl carbonate, A synthetic strategy for synthesizing deoxybenzoin-based polycarbonates is provided in Scheme A1.

Scheme A1

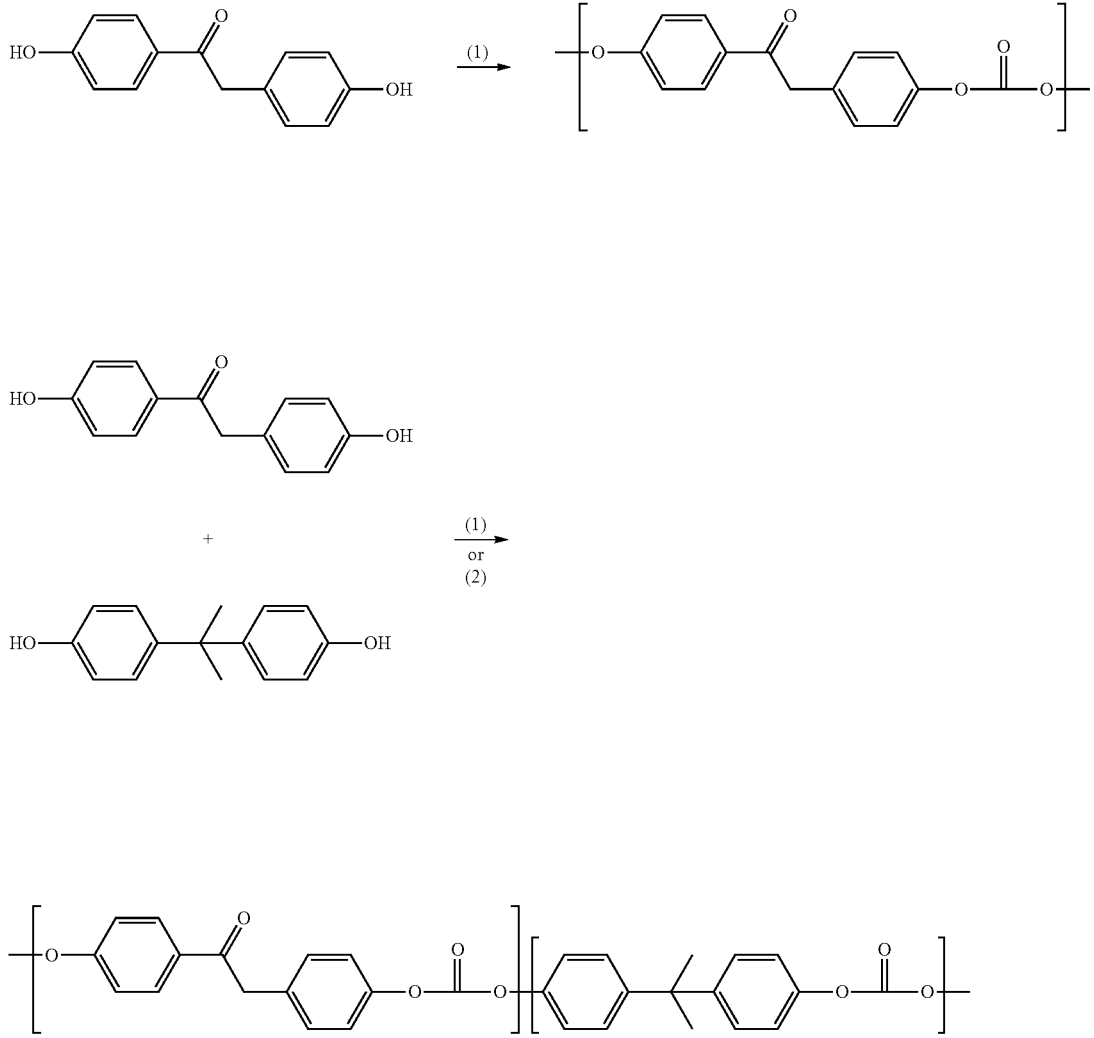

(1) COCl$_2$, Et$_3$N, DMAP (car.), CH$_2$Cl$_2$, 25° C.
(2) Diphenyl carbonate, LiOH, H2O (cat.)

For example, a series of copolycarbonates containing BPA and BHDB were prepared by solution polycondensation using phosgene while varying the molar ratios of the two bisphenols. The polymerization uses triethylamine as base, 4-dimethylaminopyridine as catalyst, and 4-t-butylphenol as end-capping agent in anhydrous dichloromethane. Extraction of the reaction mixture with dichloromethane, followed by a washing with water, and precipitation into methanol afforded the polymers as white fibrous solids. The polycarbonates prepared (e.g., including without limitation, the random copolymers of Scheme A1) in this fashion were soluble in many organic solvents, including chloroform, dichloromethane, THF, DMF and DMSO, whereas the BHDB-polycarbonate was sparingly soluble in most of these solvents, but gave good solubility in DMF and DMSO.

PCFC was employed to measure the flammability characteristics such as heat release capacity (HRC) and total heat release (THR) for the polycarbonates. The BPA-polycarbonate exhibited HRC of ~400 J/g-K, which indicates its modest flammability properties (Table A1). Upon integration of about 30 mole percent BHDB units into the polycarbonate resulted in ~60% reduction in HRC. Increasing the BHDB content further to 75% resulted in HRC of ~100 J/g-K and this copolymer falls into the ultra-fire-resistant category. TGA studies indicated a steady increase in char yield for the copolymers upon increasing BHDB content in the backbone. All the copolymers were thermally stable as seen from their onset of decomposition temperatures at 5% weight loss were in the region of 350-400° C.

TABLE A1

Flammability and thermal properties of BPA/BHDB-polycarbonates

| Molar ratios of BPA:BHDB | PCFC | | TGA | DSC | |
|---|---|---|---|---|---|
| | Heat release capacity (J/g-K) | Total heat release (kJ-g) | Char yield (%)[b] | Tg (° C.) | Tm (° C.) |
| 100:0 | 393 ± 9 | 21.4 ± 0.6 | 21 | 145 | — |
| 71:29 | 183 ± 1 | 18.4 ± 0.1 | 26 | 141 | — |
| 43:57 | 138 ± 15 | 16.1 ± 0.6 | 27 | 132 | — |
| 25:75 | 109 ± 1 | 15.0 ± 0.2 | 28 | 128 | 214 |
| 0:100 | 61 ± 3 | 10.5 ± 0.1 | 30 | 113 | 260[c] |

[a]Decomposition temperature at 5% weight loss;
[b]Char yield at 800° C.;
[c]Crystallization temperature peak (Tc) at 220° C.

As with polycarbonates, poly(ethylene terephalate) (PET) of the prior art exhibit many commercially valuable properties. Various types of low flammability aromatic polyesters (PET-like substitutes) can be envisioned using deoxybenzoin, as shown in Scheme A2. In the first method, the deoxybenzoin unit is inserted into the aromatic polyester structure; in the second method, a terephathaloyl unit was replaced by deoxybenzoin moiety; and in the final strategy, the same was done but with a reversed connectivities.

Scheme A2
Method 1

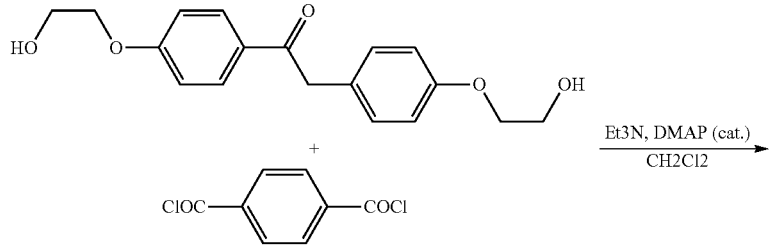

Method 2

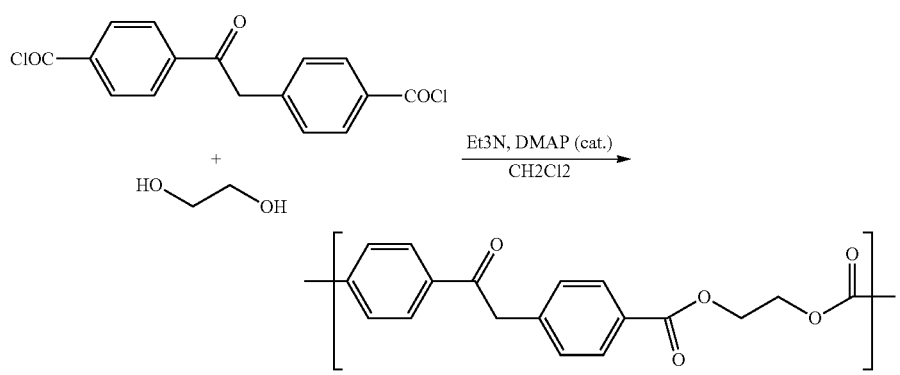

-continued

Method 3

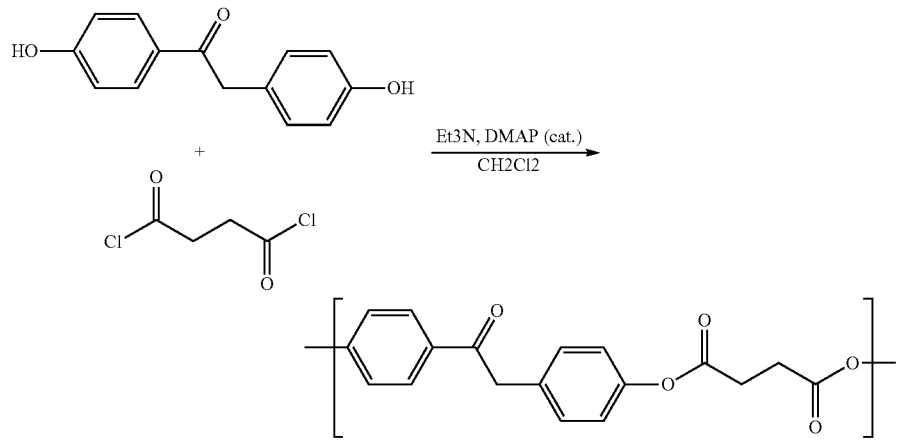

Various reaction conditions used for the synthesis of such aromatic polyesters according to Method 1 are provided given in Table A2, together with molecular weight characterization, thermal and flammability data.

TABLE A2

| Amount of solvent (mL) used per gram of monomer | GPC Mw, g/mol (PDI) | PCFC HRC (J/g-K) | PCFC THR (kJ/g) | TGA Char yield (%) | DSC Tg (° C.) |
|---|---|---|---|---|---|
| 25 | 22,000 (1.78) | 199 ± 3 | 10.0 ± 0.2 | 25 | 83 |
| 20 | 30,700 (1.80) | 225 ± 13 | 10.4 ± 0.5 | 28 | 79 |
| 15 | 40,900 (1.79) | 240 ± 15 | 11.7 ± 0.4 | 30 | 83 |

Examples of synthesis of fire-resistant, deoxybenzoin-based polyurethanes are provided below. The two approaches to make polyurethanes (with reverse connectivity) containing deoxybenzoin moiety in the polymer backbone are given in Scheme A3.

Scheme A3

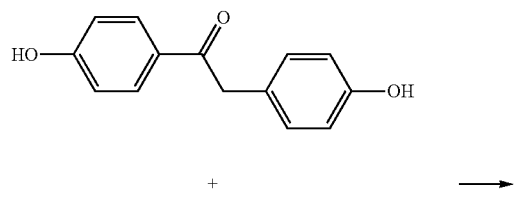

-continued

R = aliphatic or aromatic groups

In these reactions, standard polyurethane conditions may be used, such as bibutyltindilaurate catalysis, and N,N-dimethylformamide or N-methylpyrolidone as solvent. Depending on the R group of diamine or diol, a variety of polyurethanes can be obtained. If the R group is aliphatic spacer, then it leads to flexible polyurethanes, whereas use of aromatic groups result in rigid polyurethanes.

Aliphatic spacers of various lengths can be incorporated into the BHDB moiety in order to increase the flexibility as well as increasing the nucleophilicity of hydroxyl groups. One such example is shown in Scheme A4.

Scheme A4

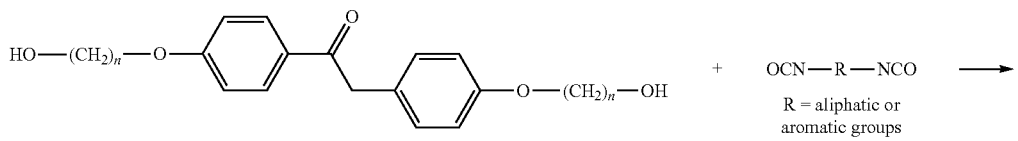

R = aliphatic or aromatic groups

-continued

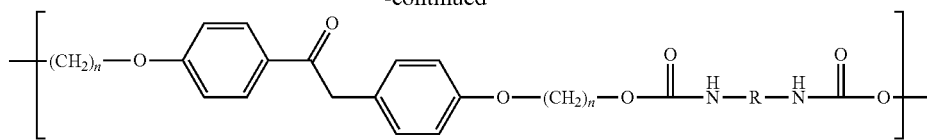

In another aspect, the present invention generally relates to polymers comprising a structural repeating unit having the structure of:

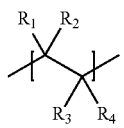

I wherein
each of $R_1$, $R_2$, $R_3$ and $R_4$ is independently selected from hydrogen, un-substituted or substituted alkyl, and aryl groups, provided that at least one of $R_1$, $R_2$, $R_3$ and $R_4$ comprises a deoxybenzoin moiety having the structure of:

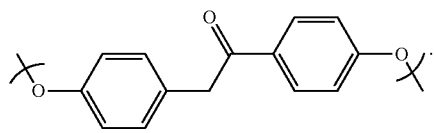

II

In certain embodiments, each of $R_1$, $R_2$, and $R_3$ is independently selected from hydrogen, un-substituted or substituted alkyl, and aryl groups and $R_4$ is

III wherein X is a unsubstituted or substituted bivalent alkyl or aryl group, and $R_5$ is a hydrogen, substituted or un-substituted alkyl or aryl groups.

The polymer may be a co-polymer, for example, further comprises a structural repeating unit having the structure of

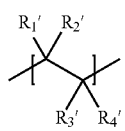

wherein each of $R_1'$, $R_2'$, $R_3'$ and $R_4'$ is independently selected from hydrogen, un-substituted or substituted alkyl, and aryl groups.

In certain embodiments, the polymer includes a structural repeating unit having the structure of:

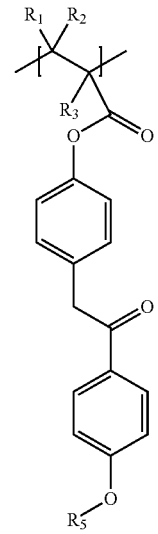

wherein each of $R_1$, $R_2$, $R_3$, and $R_5$ is independently selected from hydrogen, un-substituted or substituted alkyl, and aryl groups.

In certain embodiments, the polymer may include a structural repeating unit having the structure of:

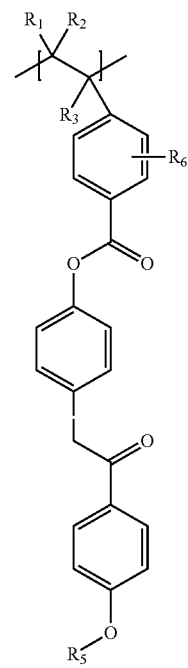

wherein each of $R_1$, $R_2$, $R_3$, and $R_5$ is independently selected from hydrogen, un-substituted or substituted alkyl, and aryl groups, and $R_6$ is a —OH, or substituted or un-substituted alkyl groups.

In certain embodiments, the polymer may include a structural repeating unit having the structure of:

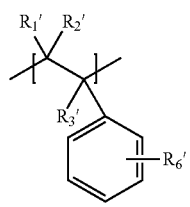

wherein each of $R_1'$, $R_2'$, and $R_3'$ is independently selected from hydrogen, un-substituted or substituted alkyl, and aryl groups, and $R_6'$ is one or more of —OH, or substituted or un-substituted alkyl groups.

The copolymer of the invention may include a structural repeating unit selected from methylmethacrylate, acrylonitrile, butadiene, ethylene, isoprene, or derivatives thereof.

Chain-growth polymers, such as polystyrene (PS) and poly(methyl methacrylate) (PMMA), are commodity polymers with numerous current commercial uses. These polymers possess high flammability levels, as reflected in their heat release capacity (HRC) values measured by pyrolysis combustion flow calorimetry (consider, e.g., HRC values of 930 J/g-K for polystyrene and 510 J/g-K for PMMA). As discussed above, a typical method of reducing flammability of these polymers is by the addition of halogenated flame-retardants during processing. Due to environmental and health concerns associated with these additives, and legislation that has, or shortly will, ban their use, it is imperative to look into alternative methods to reduce the flammability of chain-growth polymers. As illustrated in Scheme A5 and Scheme A6, representative monomers of this invention were designed in such a way to incorporate deoxybenzoin (DB) moiety as a pendant group. In accordance with various broader aspects of this invention, homo- and copolymers of PS-DB and PMMA-DB were then prepared from these monomers by free-radical polymerization.

Scheme A5

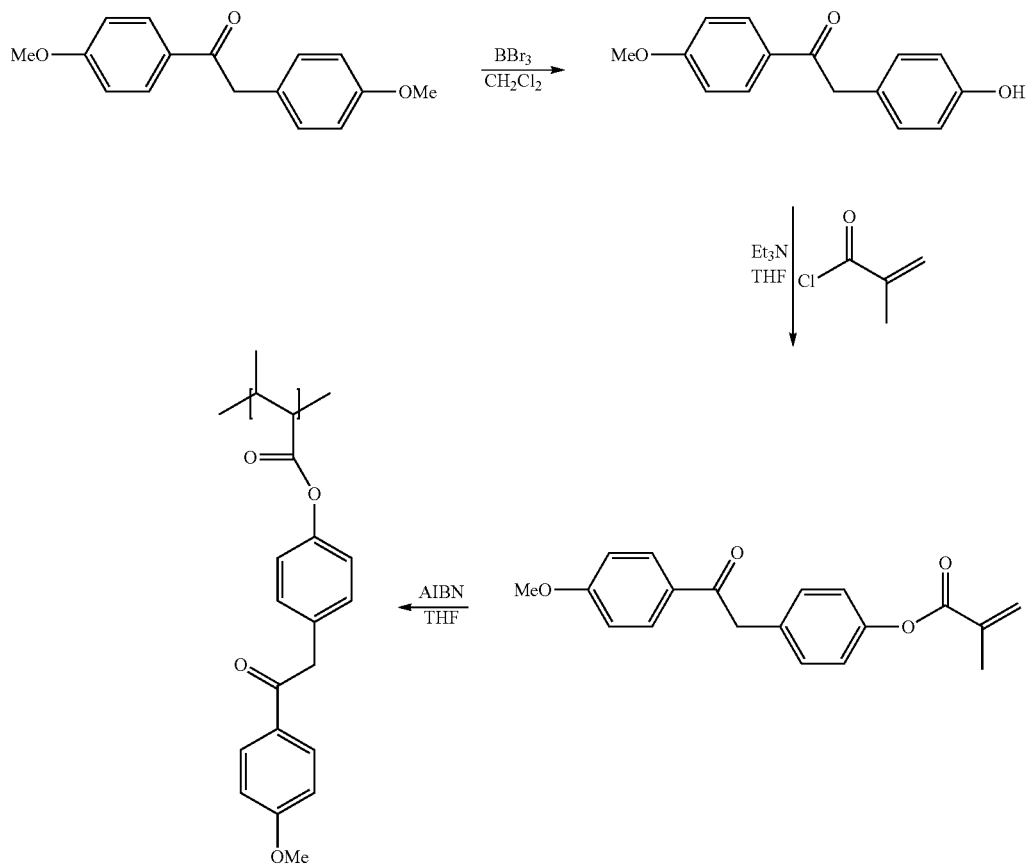

Initial characterization of the free-radical polymerization of polyolefins containing deoxybenzoin pendant groups indicated high molecular weights PS (Mw=40,000-180,000 g/mol) and PMMA (Mw=80,000-130,000 g/mol), respectively. PCFC and thermogravimetric analysis (TGA) of homo and copolymer PS-DB showed HRC of in the 230-450 (J/g-K) range, and char yields of ~40-20 weight percent, depending on the molecular weight and composition of styrene and styrene-DB (Table A3).

Initial PCFC and TGA data of the free-radical polymerization of PMMA containing deoxybenzoin pendant groups indicated HRC of 270 (J/g-K) and char yield of 5 wt %.

PS-DB and PMMA-DB homo and copolymers displayed good solubility in many common solvents, including chloroform, THF, DMSO, and DMF.

TABLE A3

Characterization data of PS and PS-DB homo- and copolymers

| Entry | St:St-DB (wt %) | Mwa) (g/mol) | PDI | HRCc) (J/g-K) | Char yieldc) (%) | Tgd) (° C.) |
|---|---|---|---|---|---|---|
| Example 1 | 100:0 | 301,000b) | 2.11 | 987 | 0 | 108 |
| Example 2 | 50:50 | 41,000 | 2.15 | 455 | 9 | 103 |
| Example 3 | 0:100 | 173,800 | 3.50 | 236 | 18 | 128 |
| Example 4 | 0:100 | 63,300 | 1.79 | 345 | 17 | 132 |

Polyolefins and various other chain-growth polymers comprising deoxybenzoin pendant groups can include, without limitation, corresponding random, block, statistical, segmented, graft, graft-block and star-shaped copolymers. Representative, non-limiting examples include copolymers of styrene, methylmethacrylate, acrylonitrile, butadiene, ethylene, isoprene, and with acrylonitrile and butadiene (to give ABS terpolymers). Other variations, as would be understood by those skilled in the art made aware of this invention, include deoxybenzoin-based homopolymers and random, statistical, block and segmented copolymers of polystyrenes with different types of tacticity (syndiotactic, isotactic, and atactic), as well as blends or composites with deoxybenzoin-based homo and block copolymers of PS and PMMA—such homopolymers, copolymers, blends or composites as can be used in conjunction with additives such as flame retarding inorganic or organic materials.

Scheme A6

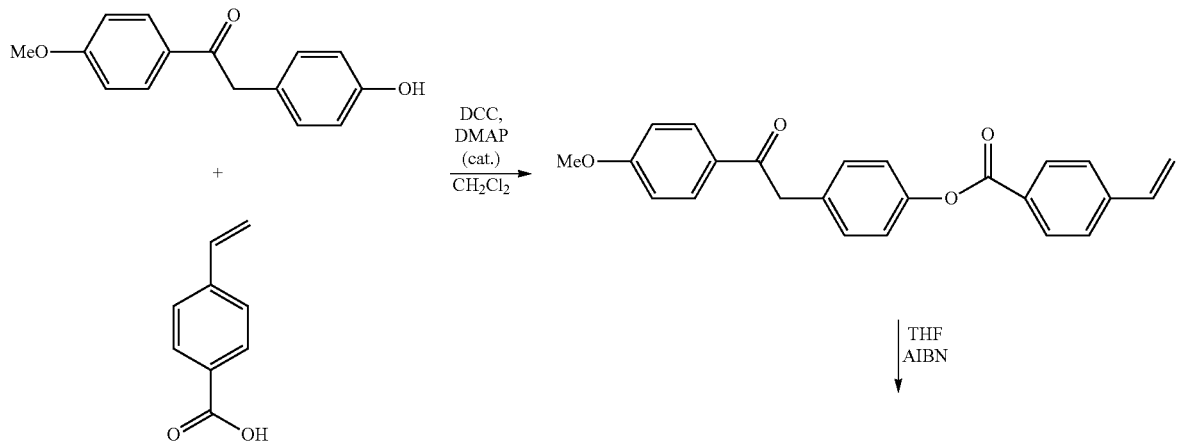

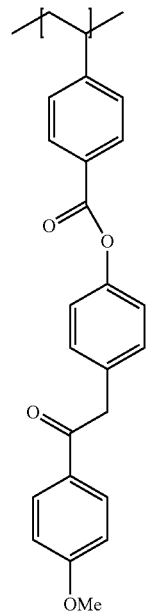

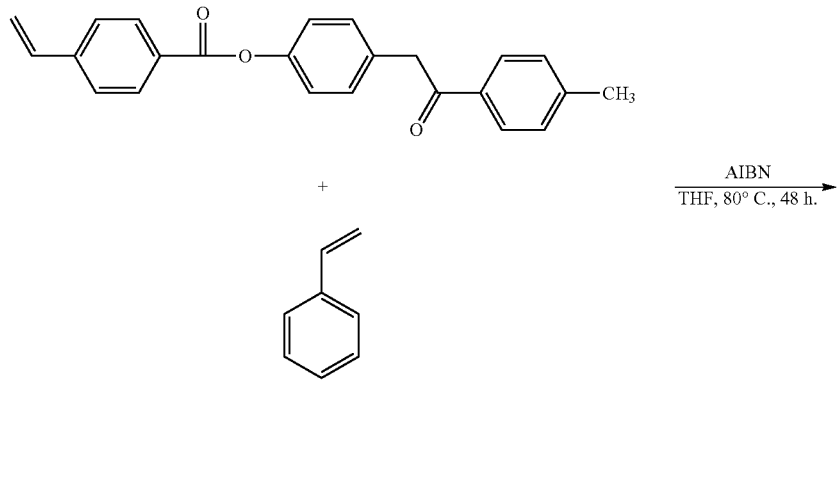
+
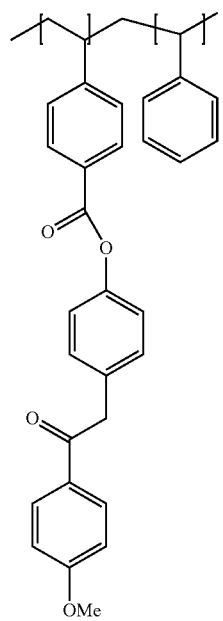

Copolymers of the invention include random copolymer, statistical copolymers, block copolymers, graph-block copolymers, star-shaped copolymers, etc.

The present invention also encompasses composite materials that comprises a polymer of the invention. The composite material may further comprising a flame-retarding additive.

The present invention also encompasses a polymer resin of the polymer of the invention, wherein the polymer resin has heat release capacity (HRC) of less than 200 J/g-K, preferably less than 150 J/g-K, more preferably less than 100 J/g-K.

A polymer resin of the polymer may have a char yield of between 20% to 40%, between 25% and 35%, between 30% and 40% and more than 40%.

The invention further encompasses a product comprising a deoxybenzoin-derived polymer of the invention. The deoxybenzoin moiety may be found in the backbone or in the pendant side chain of the polymer. For example, a product may include a polymer having a polyethylene or a polystyrene backbone and deoxybenzoin-containing side chains. The polymer has a $M_w$ of greater than 10,000, preferably greater than 50,000, and more preferably greater than 100,000.

b. Diepoxide (or Diglycidyl Ether) of BHDB

The difficulty of addressing the tradeoff between polymer flammability and flame retardant toxicity has persisted in the research and industrial communities. Surprisingly discovered is the diepoxide (or diglycidyl ether) of BHDB, termed BEDB (meaning bisepoxydeoxybenzoin), as a novel crosslinker for epoxy adhesive chemistry. According to the present invention, BEDB, despite its lack of halogen, gives adhesive materials with low flammability, and also excellent mechanical properties. Moreover, the influence of curing agents on char formation, and the flame-retardancy of the BEDB resins cured with various aromatic diamines are discussed.

Thus, in one aspect of the present invention, a novel epoxy compound, BEDB, was designed, synthesized, and implemented for the preparation of novel epoxy resins. These BEDB resins, though halogen-free, have HRC values that approach the halogenated versions, and that are significantly lower than conventional non-halogenated versions. Various epoxy formulations were prepared and tested. In case of the epoxy resins cured with aromatic amines, the BEDB based resins had lower $T_g$ than those based on BPA. However, due to the effective char-formation of BEDB, the char residues of the BEDB resins (30-35%) were much higher than those of the EBPA resins (12-16%) and ETBBA resins (23-24%), and the HRC of the EBHDB resins were lower than those of the EBPA resins. When the mixed amine with the same mole fraction of 4,4'-DDS and 4,4'-DDM was used as curing agent, the cured resin based on BEDB exhibited lower HRC than those cured a single amine. The brominated epoxy materials gave moderately lower HRC values relative to the BEDB materials. This rather small penalty in heat release associated with the absence of halogen bodes well for the future use of BEDB and related molecules in materials for which halogenation is undesirable for in the content of environmentally appropriate molecules, and as a component of solutions to the flame retardant dilemma. In addition, the adhesive strength and fracture toughness of BEDB-based resins were significantly higher than those of BPA-based resins. It appears that utilization of the BEDB epoxide can greatly improve flame resistance, as well as enhance the fracture toughness and adhesion of its cured resins.

Experimental

Materials.

The diglycidyl ether of BPA (EBPA, DER332) was obtained from Dow Chemical Co. and used as received. Desoxyanisoin, pyridine hydrochloride, epichlorohydrin, and all of the amines used in this work were purchased from Sigma-Aldrich and used without further purification.

Characterization.

$^1$H and $^{13}$C nuclear magnetic resonance (NMR) spectra were obtained on a Bruker AVANCE 400 NMR spectrometer. In order to investigate the curing behavior and glass transition temperature ($T_g$) of epoxy resins, differential scanning calorimetry (DSC) was performed on a DuPont DSC 2910 using a heating rate of 10° C./min. Thermogravimetric analysis (TGA) was conducted in a nitrogen atmosphere on a DuPont TGA 2950 using a heating rate of 10° C./min. Char yields were determined by TGA from the mass of the residue remaining at 850° C. Specific heat release rate (HRR, W/g), heat release capacity (HRC, J/(g K)), and total heat release (THR, kJ/g) were measured using a pyrolysis combustion flow calorimeter (PCFC) on 3-5 mg samples of cured resins. PCFC experiments were conducted from 100 to 900° C. at a heating rate of 1° C./s in a 80 cm$^3$/min stream of nitrogen. The anaerobic thermal degradation products in the nitrogen gas stream are mixed with a 20 cm$^3$/min stream of oxygen prior to entering the combustion furnace (900° C.). The heat is determined by standard oxygen consumption methods. During the test, HRR is obtained by dividing dQ/dt, at each time interval, by the initial sample mass, and HRC is obtained by dividing the maximum value of HRR by the heating rate in the test. To ensure reproducibility, three-to-five sample runs were conducted for each cured resin.

Mechanical Properties.

Dynamic mechanical analysis (DMA) was performed with a TA Instrument DMA 2980, using specimens of 20 mm length, 5 mm width, and ~0.7 mm thickness. The storage modulus (E') and tan δ were determined at a programmed heating rate of 3° C./min from room temperature to 270° C. at a frequency of 1 Hz. The materials were tested during a second heating to determine if further curing had taken place. Compact tension (CT) specimens having dimensions of approximately (2.5×2.4×0.5) cm were tested following ASTM D 5045-99 protocol. The specimens were pre-cracked with a Leco VC-50 diamond saw and a razor blade, and tested at a crosshead speed of 0.5 mm/min on an Instron 4411 equipped with a 0.1 kN (10 kg) load cell. The value of the crack length/width (a/W) of specimens is approximately 0.5. Three to five specimens of each resin formulation were tested at room temperature. Lap shear testing was carried out following ASTM D 1002. Lap shear specimens having a bond area of 12.7 mm$^2$ were made using two 2024-T3 aluminum panels. Bond line thickness was controlled by the inclusion of short lengths of 0.127 mm diameter wire. Tests were conducted at a crosshead speed of 50 mm/min on an Instron tensile test machine. For reproducibility, three-to-five specimens of each formulation were tested (each at room temperature).

Synthesis of 4,4'-bishydroxydeoxybenzoin (BHDB)

4,4'-Bishydroxydeoxybenzoin (BHDB) was prepared by demethylation of desoxyanisoin, according to the literature. (See, Ellzey et al. *Macromolecules* 2006; 39: 3553-3558; Ranganathan et al. *Macromolecules* 2006; 39: 5974-5975.) Desoxyanisoin (50 g, 195.1 mmol) and pyridine hydrochloride (90.2 g, 780.5 mmol) were added to a round-bottom flask equipped with a condenser. The mixture was refluxed for 5 h at 200° C., cooled to room temperature, and poured into water. The precipitate was filtered and recrystallized from acetic acid to give 38 g (85% yield) of the desired product. $^1$H-NMR (DMSO-$d_6$, ppm): 10.35 (s, 1H, HO—Ar—CO), 9.28 (s, 1H, HO—Ar—CH$_2$), 7.91 (d, 2H, Ar—H), 7.05 (d, 2H, Ar—H), 6.84 (d, 2H, Ar—H), 6.68 (d, 2H, Ar—H), 4.09 (s, 2H, Ar—CO—CH$_2$—Ar)

Synthesis of the Diepoxide (Diglycidyl Ether) of 4,4'-Bishydroxydeoxybenzoin (BEDB)

Epichlorohydrin (50 g, 540 mmol), BHDB (12.4 g, 54.3 mmol), 2-propanol (26.9 g, 45 mmol), and water (4.3 g) were added to a round-bottom flask and stirred at 65° C. A 20% aqueous sodium hydroxide solution (19.5 g) was added dropwise over 45 minutes, and stirring was continued for 30 minutes. The mixture was cooled to room temperature, and chloroform (200 mL) was added. The organic layer was washed extensively with water, and the combined organic extract was dried over magnesium sulfate. Solvents were removed by rotary evaporation, and the residue was dissolved in chloroform, then precipitated into hexanes to give 14.8 g (80% yield) of BEDB as a pale yellow solid. $^1$H-NMR (CDCl$_3$, ppm): 7.99 (d, 2H, Ar—H), 7.18 (d, 2H, Ar—H), 6.91 (d, 2H, Ar—H), 6.88 (d, 2H, Ar—H), 4.32-4.17 (m, 2H, 2(—O—CH$_2$-Oxirane)), 4.17 (s, 2H, Ar—CO—CH$_2$—Ar), 4.01-3.92 (m, 2H, 2(—O—CH$_2$-Oxirane)), 3.39-3.32 (m, 2H, 2(Oxirane CH)), 2.94-2.88 (m, 2H, 2(Oxirane CH$_2$)), 2.78-2.74 (m, 2H, 2(Oxirane CH$_2$)). $^{13}$C-NMR (CDCl$_3$, ppm): 196.5, 1623, 157.4, 130.9, 130.5, 130.0, 127.5, 114.8, 114.4, 68.9, 68.8, 50.2, 49.9, 44.7, 44.6, 44.4. HRMS-FAB m/z [M+H]$^+$ calcd. 340.1311. found 340.1293.

Synthesis of the Diepoxide (Diglycidyl Ether) of 3,3',5,5"-Tetrabromobisphenol a (ETBBA)

(See, Wang et al. *J Appl Polym Sci* 1991; 43: 1315-1321.) ETBBA was prepared in a similar manner as BEDB, using TBBA (24.9 g) instead of BHDB. This gave ETBBA (25.4 g, 85%). $^1$H-NMR (CDCl$_3$, ppm): 7.30 (s, 4H, Ar—H), 4.21-4.18 (q, 2H, 2(—O—CH$_2$-oxirane)), 4.09-4.05 (q, 2H, 2(—O—CH$_2$-oxirane)), 3.51-3.46 (m, 2H, 2(oxirane CH)), 2.92-2.90 (t, 2H, 2(oxirane CH$_2$)), 2.75-2.74 (q, 2H, 2(oxirane CH$_2$)), 1.60 (s, 6H, Ar—C(CH$_3$)$_2$—Ar).

Preparation of Cured Resins.

Samples for TGA, PCFC, and DMA were prepared by mixing the diepoxides with a stoichiometric equivalent of curing agent at 60-130° C. The homogeneous mixtures were cured for 2 hours at 130-180° C., followed by a 2 hour post-cure at 180-200° C. in a Teflon mold. Mixing and curing temperatures were optimized by considering the glass transition temperature and gelation rate of each formulation.

Synthesis of BEDB

BEDB, the diepoxide (or diglycidyl ether) of BHDB, was prepared by reacting BHDB with epichlorohydrin under basic conditions, as shown in Scheme B1. BEDB was obtained as a white solid in 80% yield, with a distinctly higher melting point (125-130° C.) than the BPA version (43-47° C.). Nuclear magnetic resonance (NMR) spectroscopy confirmed the intended structure, as seen for example in the proton spectrum showing a singlet at 4.17 ppm for the methylene group adjacent to the ketone, and characteristic glycidyl ether resonances at 4.25, 3.95, and 2.76 ppm. BEDB was then used as the electrophilic difunctional monomer in curing reactions with multifunctional nucleophiles, including 4,4'-diaminodiphenyl sulfone (4,4'-DDS), 4,4'-diaminodiphenyl methane (4,4'-DDM), and meta-phenylene diamine (m-PDA).

Scheme B1

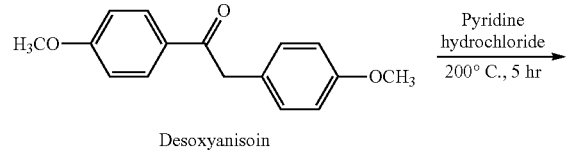

Desoxyanisoin

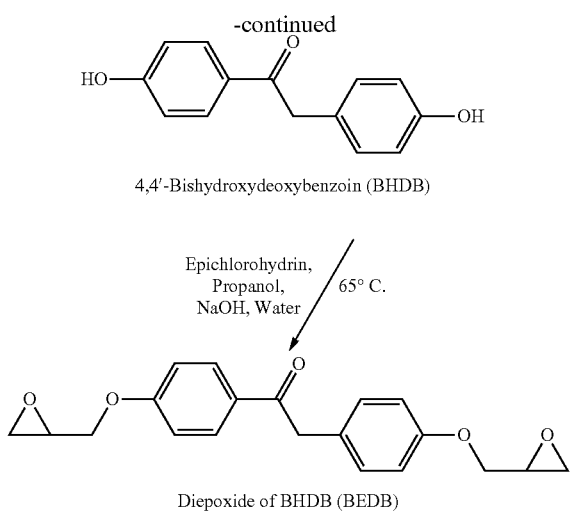

4,4'-Bishydroxydeoxybenzoin (BHDB)

Diepoxide of BHDB (BEDB)

Thermal Properties of Cured BEDB Resins.

BEDB, EBPA, and ETBBA epoxy formulations were prepared using 4,4'-DDS, 4,4'''-DDM, and mPDA as the curing agents (Table B1). Homogeneous formulations were prepared by mixing the liquid-phase epoxides with the amines at 60-130° C. In the DSC instrument, the mixtures were heated to fully cure the formulation (i.e., when no further increase in the heat of reaction was seen), and the reported glass transition temperatures were taken from the second heating curves of the fully cured samples (following quenching with liquid nitrogen). Several interesting characteristics were noted in the cured resins. The BEDB-based resins consistently gave the lowest $T_g$ values, which might be due to the absence of the steric bulk between the phenyl groups of BPA and TBBA. In addition, those cured with DDS had the highest $T_g$ values, possibly due to a combination of the polarity and rigidity of the sulfonyl groups in the DDS-containing networks.

TABLE B1

Thermal properties of epoxy formulations.

| | Thermal property | | | Heat release | |
|---|---|---|---|---|---|
| Formulation | $T_g$ (° C.)[a] | $T_{di}$ (° C.)[b] | Residue (%)[c] | HRC (J/(g K)) | THR (kJ/g) |
| EBPA/4,4'-DDS | 198 | 385 | 12 | 513 ± 10 | 25.3 ± 0.2 |
| BEDB/4,4'-DDS | 181 | 377 | 30 | 420 ± 14 | 17.2 ± 0.2 |
| ETBBA/4,4'-DDS | 213 | 304 | 23 | 443 ± 11 | 4.8 ± 0.2 |
| EBPA/4,4'-DDM | 179 | 372 | 16 | 737 ± 24 | 25.8 ± 0.6 |
| BEDB/4,4'-DDM | 145 | 354 | 35 | 439 ± 7 | 17.6 ± 0.2 |
| ETBBA/4,4'-DDM | 192 | 274 | 24 | 308 ± 14 | 4.5 ± 0.2 |
| EBPA/mPDA | 176 | 367 | 14 | 761 ± 23 | 25.8 ± 0.6 |
| BEDB/mPDA | 144 | 340 | 29 | 391 ± 40 | 19.7 ± 0.8 |
| ETBBA/mPDA | 177 | 263 | 23 | 238 ± 3 | 5.0 ± 0.2 |

[a] $T_g$s were obtained from DSC.
[b] 5 wt % loss temperature on TGA.
[c] Char residues were obtained from TGA at 850° C. in nitrogen (heating rate 10° C./min).

With the exception of the ETBBA resins, the initial degradation temperatures ($T_{di}$) the formulations were near or above the mid-300° C. range. It is known that the presence of bromine reduces the thermal stability of amine-cured epoxy resins, and TBBA resins specifically are destabilized by formation of HBr, and instability of the cyclohexadienone structure produced the initial step of thermal decomposition. (See, Lo et al. *J Polym Sci: Polym Chem Ed* 1984; 22: 1707-1715; Luda et al. *Polym Degrad Stabil* 2007; 92: 1088-1100.)

Heat Release Properties of Cured BEDB-Based Resins.

Pyrolysis combustion flow calorimetry (PCFC), an oxygen consumption technique, measures 1) total heat release (THR), i.e., the heat of complete combustion of the pyrolysis gases per unit initial mass of a material, 2) heat release capacity (HRC), i.e., the maximum heat release rate divided by the constant heating rate, and 3) $T_{max}$, i.e., the sample temperature at maximum heat release rate. While an ideal predictor of flammability would be the heat release rate, this depends on the sample heating rate, making quantification difficult. HRC eliminates this uncertainty, more reliably predicting polymer flammability as an inherent material property). PCFC is now recognized as a convenient analytical tool for analyzing small scale (milligram) samples of combustible materials. (See, Walters et al. *J Appl Polym Sci* 2003; 87: 548-563; Lyon et al. *J Anal Appl Pyrolysis* 2004; 71: 27-46) and is used here to characterize the cured epoxy resins. In addition, thermogravimetric analysis (TGA) was conducted, also on the cured materials, to evaluate char yields. By both measures (PCFC and TGA), BEDB-based resins are quite promising materials. For example, the BEDB/m-PDA revealed a HRC of 390 Ng K), approximately half of that obtained for conventional EBPA/m-PDA resin (HRC of 760 J/(g K)). Char yields of the BEDB-based epoxies were at least twice that of the BPA versions, increasing from about 12% for BPA-based adhesives to 25-30% for BEDB-based resins.

The BEDB- and TBBA-based resins showed much lower HRC and THR relative to the BRA-based resins. Halogen-containing polymers usually produce high levels of incomplete combustion products, and non-combustible gas, which contribute to gas phase combustion inhibition. In spite of halogen-free compounds, the BEDB-based resins exhibit significantly lower HRC and THR than those of the BPA resins. This is because that the effective char formation at the molecular level is to reduce the amount of combustible products and gases.

BEDB Resins Cured with Mixtures of Diamines

Figure 2:
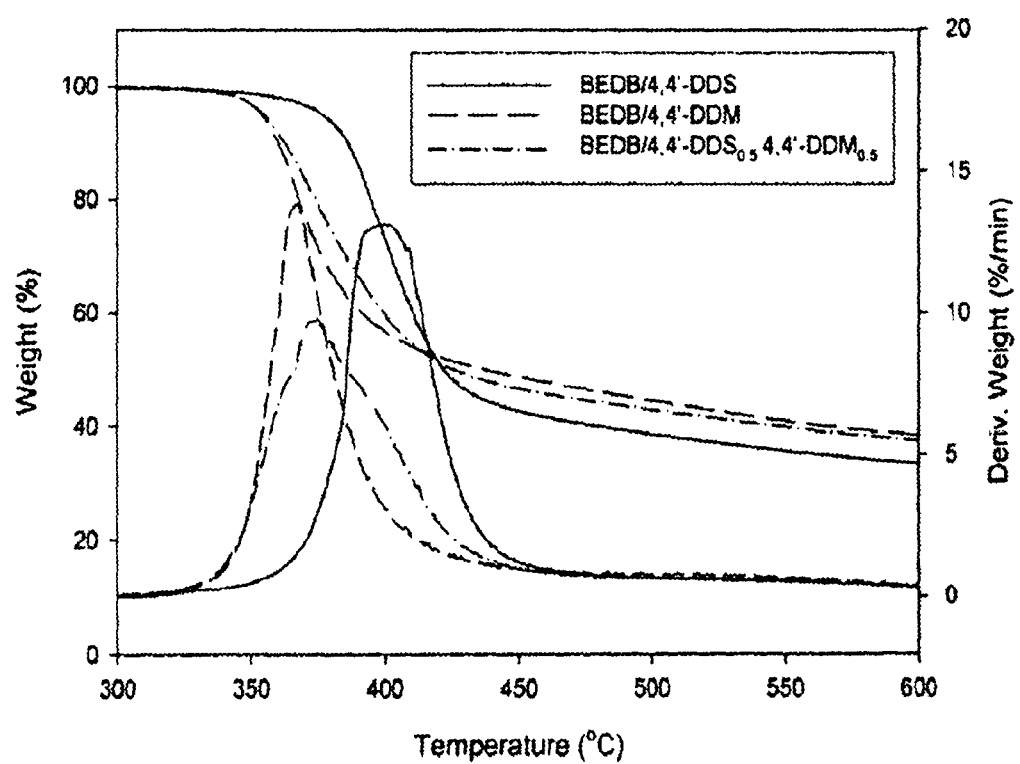
FIG. 2 shows certain exemplary TGA thermograms of BEDB resin.

FIG. 2 shows TGA thermograms of BEDB resins cured with 4,4'-DDS, 4,4'-DDM, and a mixture of 4,4'-DDS and 4,4'-DDM. The derivative weight curve of the resin cured with mixed amities is broader and its maximum value is smaller than those of the resins cured with a single amine. Because HRC is directly proportional to ∂w/∂T and the heat of combustion, this reduction in the maximum value of derivative weight can reduce HRC. To investigate the effects of mixed amines on flammability, amine formulations were prepared for BEDB and EBPA. The results for the formulations are listed in Table B2. In the cured resins with the mixed amines, the $T_g$ increased with the mole fraction of 4,4'-DDS, and the char residue increased with the mole fraction of 4,4'-DDM. The HRC of the BPA based resin is roughly dependent on the mole fraction of 4,4'-DDS, and is the lowest (454±30 J/(g K)) at 0.8 mole fraction of 4,4'-DDS. However, in case of the BEDB based resins, the resins cured with the same mole fraction of 4,4'-DDS and 4,4'-DDM has the lowest HRC (321±10 J/(g K)). This tempering of heat release in the cured systems is appealing for future integration of BEDB into materials applications, if mechanical properties are sufficiently comparable to those of materials in use today.

TABLE B2

Thermal properties and flammability of the resins cured with mixed amines.

| Formulation [a] | Thermal property | | Flammability | |
|---|---|---|---|---|
| | $T_g$ (°C.) [b] | Resi- due (%) [c] | HRC (J/(g K)) | THR (kJ/g) |
| EBPA/4,4'-DDS | 198 | 12 | 513 ± 10 | 25.3 ± 0.2 |
| EBPA/4,4'-DDS$_{0.8}$ 4,4'-DDM$_{0.2}$ | 196 | 14 | 454 ± 30 | 24.9 ± 0.4 |
| EBPA/4,4'-DDS$_{0.5}$ 4,4'-DDM$_{0.5}$ | 185 | 15 | 577 ± 28 | 25.4 ± 0.2 |
| EBPA/4,4'-DDS$_{0.2}$ 4,4'-DDM$_{0.8}$ | 178 | 16 | 693 ± 21 | 26.2 ± 0.4 |
| EBPA/4,4'-DDM | 179 | 16 | 737 ± 24 | 26.8 ± 0.4 |
| BEDB/4,4'-DDS | 181 | 30 | 420 ± 14 | 17.2 ± 0.2 |
| BEDB/4,4'-DDS$_{0.8}$ 4,4'-DDM$_{0.2}$ | 180 | 33 | 342 ± 4 | 17.5 ± 0.5 |
| BEDB/4,4'-DDS$_{0.5}$ 4,4'-DDM$_{0.5}$ | 173 | 34 | 321 ± 10 | 16.9 ± 0.3 |
| BEDB/4,4'-DDS$_{0.2}$ 4,4'-DDM$_{0.8}$ | 160 | 35 | 378 ± 29 | 16.9 ± 0.1 |
| BEDB/4,4'-DDM | 145 | 35 | 439 ± 7 | 17.6 ± 0.2 |

[a] Subscripts mean mole fraction of compounds.
[b] $T_g$s were obtained from DSC.
[c] Char residues were obtained from TGA at 850° C. in nitrogen (heating rate 10° C./min).

Mechanical Properties of BEDB-Based Epoxy Resins

Figure 3:
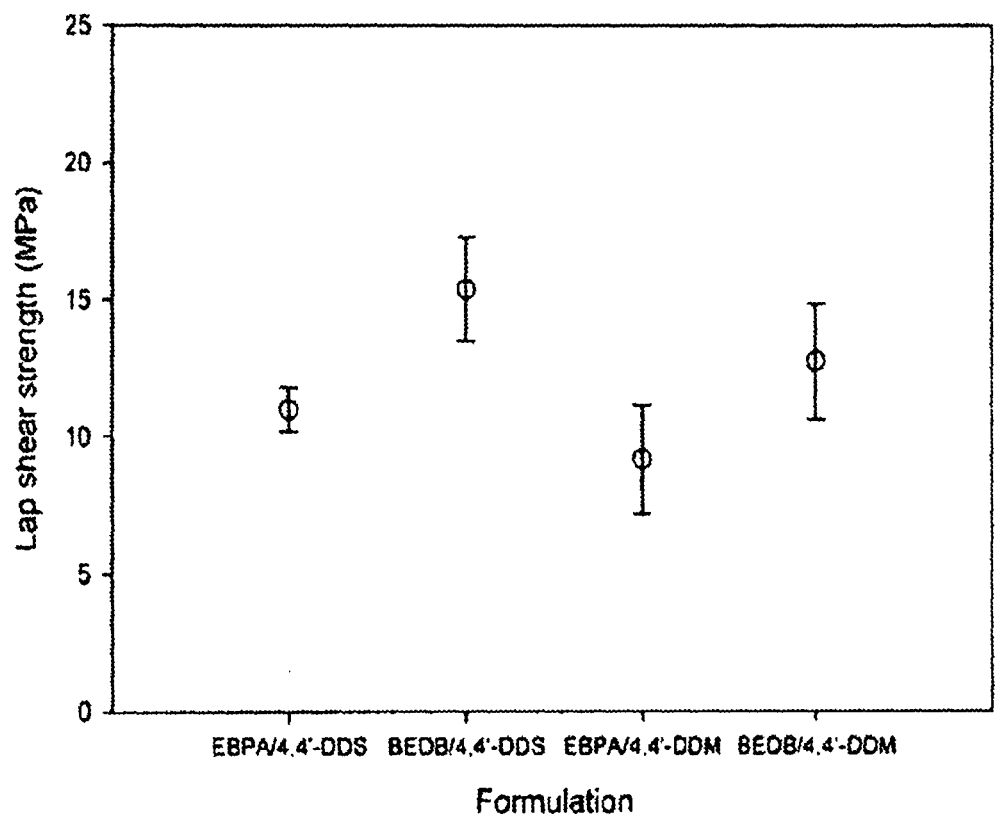
FIG. 3 shows certain exemplary lap shear strength measurement of certain BEDB-based resins.

The adhesion strength of cured epoxy resins are derived from several elements, including the hydroxyl groups generated during the curing, the functionality of the components used, and the chemical structures of particular epoxide and curing agent. (See, Pham et al, *Encyclopedia of Chemical Technology*, vol. 10, New York: Wiley, 2004. pp. 347-461.) Lap shear, a characteristic test of bonding shear strength, is indicative of adhesive environmental durability. In accord with the ASTM D 1002 protocol, lap shear tests were performed on the epoxy resins, using three-to-five specimens of four formulations: 1) EBPA/4,4'-DDS; 2) BEDB/4,4'-DDS; 3) EBPA/4,4'-DDM; and 4) BEDB/4,4'-DDM. The results are presented in FIG. 3, The lap shear strengths of BEDB-based resins cured with 4,4'-DDS and 4,4'-DDM were measured as 15.4 MPa and 12.8 MPa, and those of BPA based resins, also cured with 4,4'-DDS and 4,4'-DDM, were measured as 11.0 MPa and 9.2 MPa, respectively. Both of these cured epoxy resins, using 4,4'-DDS as curing agent, are seen to have slightly higher adhesion strengths than those using 4,4'-DDM, and the strengths of BEDB-based epoxy resins were ~40% greater than the BPA-based resins. The superior adhesive properties of the cured BEDB resins, relative to EBPA analogs, were interesting and unexpected, but clearly indicate that BEDB-based resins have promise from a mechanical standpoint for use in practical adhesive materials.

Figure 4:
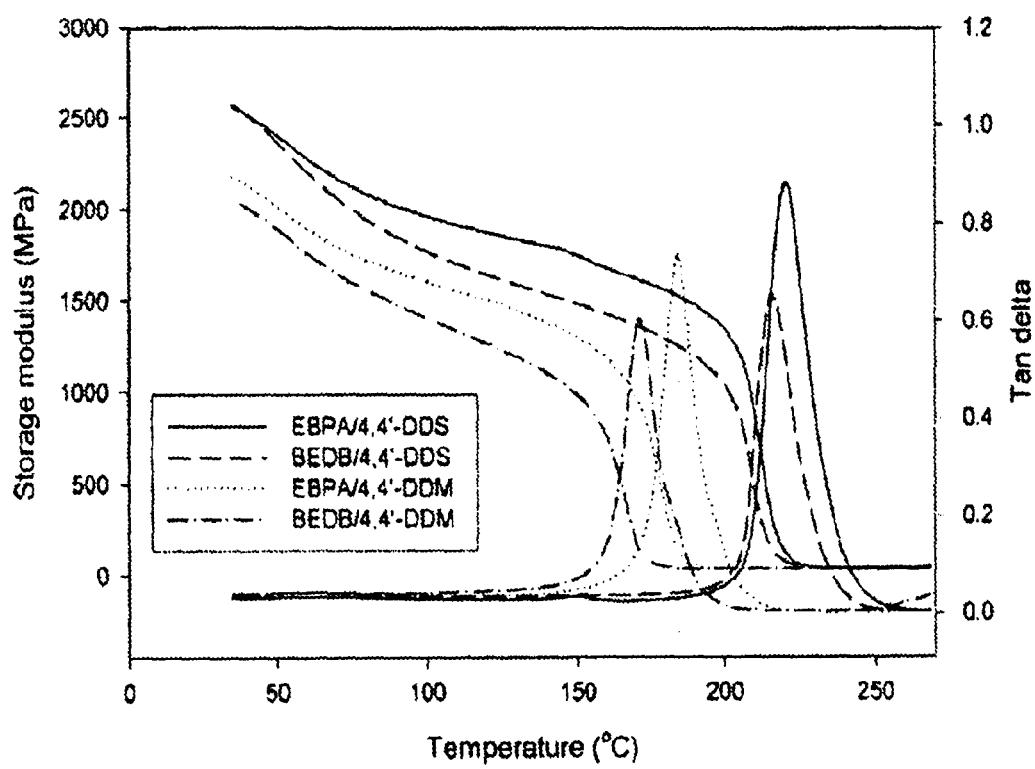
FIG. 4 shows certain exemplary plot of storage modulus and tan .delta. versus temperature certain BEDB-based resins.

The elastic modulus at temperatures above $T_g$ (e.g., $T_g$+40° C.) is valuable for characterizing highly cross-linked epoxies. Cross-link density, typically related to the average molecular weight between crosslinks ($MW_c$), is an important factor governing the physical properties of cured resins. According to rubber elasticity theory, the cross-link density of a thermoset resin is proportional to the modulus in the rubbery plateau region. (See, Katz et al. *Polymer* 1963; 4: 417-421; Lesser et al. *J Appl Polym Sci* 1997; 66: 387-395.) FIG. 4 plots storage modulus and tan δ versus temperature for EBPA/4,4'-DDS, BEDB/4,4'-DDS, EBPA/4,4'-DDM, and BEDB/4,4'-DDM, and the results are listed in Table B3. The moduli of BEDB-based epoxy resins at $T_g$+40° C. are higher than those of EBPAs. Therefore, the cross-link densities of the BEDB resins are higher than for the EBPA case, while $T_g$ values of the EBPA resins are ~5-13° C. higher than those of BEDB resins.

In each case, a second run gave data identical to the first, such that no further curing was needed.

TABLE B3

DMA analysis of the epoxy resins cured with DDS and DDM.

| Formulation | $T_g$ (°C.) | Height of tan δ | Modulus at 50° C. (MPa) | Modulus at $T_g$ + 40° C. (MPa) |
|---|---|---|---|---|
| EBPA/4,4'-DDS | 220 | 0.884 | 2407 | 34 |
| BEDB/4,4'-DDS | 215 | 0.654 | 2367 | 40 |
| EBPA/4,4'-DDM | 184 | 0.736 | 2020 | 33 |
| BEDB/4,4'-DDM | 171 | 0.606 | 1899 | 36 |

To determine the critical stress intensity factor ($K_{IC}$), and critical strain energy release rate ($G_{IC}$), compact tension specimens were prepared and tested using the different epoxide starting materials. Plain-strain fracture toughness results are shown in Table B4. The formulations cured with 4,4'-DDS showed slightly higher values than those cured with 4,4'-DDM, and the values of cured BEDB resins represent an increase of 2-3 fold over the cured EBPA resins, regardless of curing agents.

TABLE B4

Plain-strain fracture toughness of cured resins.

| Formulation | $K_{1C}$ (MPa m$^{1/2}$) | $G_{1C}$ (J/m$^2$) |
|---|---|---|
| EBPA/4,4'-DDS | 0.76 ± 0.03 | 222 ± 15 |
| BEDB/4,4'-DDS | 1.30 ± 0.03 | 659 ± 28 |
| EBPA/4,4'-DDM | 0.64 ± 0.02 | 184 ± 16 |
| BEDB/4,4'-DDM | 1.06 ± 0.04 | 553 ± 43 |

Structure/Flame-Retardancy Relationship of BEDB Resins

In an attempt to identify the influence of curing agents on char formation and the flame-retardancy of the cured resins, BEDB was used to prepare epoxy formulations with ortho-, meta-, and para-aromatic diamines which have methyl groups, chlorides, and methoxy groups in different positions. Formulations and thermal properties of epoxy resins with prepared with these different diamines are listed in Table B5. In general, resins cured with substituted diamines gave higher $T_g$ values than those prepared using non-substituted meta-phenylene diamine (mPDA). This is explained by the more restricted segmental motions of the cured resins possessing the methyl groups and chlorides in a densely cross-linked system. The resin cured with substituted benzidines, the cured resin with methyl substituent exhibited higher $T_g$ values than that of the resin cured with methoxy group. Substituted groups might cause a loss of the rigidity in para-benzidine and decrease the $T_g$ of the benzidine-cured resins. It was reported that the bisphenol A (BPA) based resins cured with meta-aromatic diamines have greater thermal stability than the para-aromatic diamine cured resins. (See, Dyakonov et al. *Polym Degrad Stabil* 1996; 54: 67-83.) However, a significant difference was not seen in the BEDB/DDS case. Initial degradation temperatures ($T_{di}$) of the resins are mid-300° C. range, except for BEDB/4-CmP resin. Unlike other formulations which have a very short interval between $T_{dmax}$ and $T_{di}$ ($\Delta T_d$), BEDB/4-CmP and BEDB/3,3'-DMoB exhibited values of 37 and 22 for $\Delta T_d$, respectively. This high $\Delta T_d$ might be related to increasing the flame-retardancy of the resin while exhibiting the same total heat release (THR).

TABLE B5

Thermal properties of EBHDB epoxy resins cured with various diamines.

| Formulation | Diamine | $T_g$ (°C.) | $T_{di}$ (°C.)[a] | $T_{dmax}$ (°C.)[b] | $\Delta T_d$ ($T_{dmax}$-$T_{di}$) |
|---|---|---|---|---|---|
| BED/4,4'-DDS | H₂N–C₆H₄–SO₂–C₆H₄–NH₂ | 181 | 377 | 399 | 22 |
| BEDB/3,3'-DDS | H₂N–C₆H₄–SO₂–C₆H₄–NH₂ (3,3') | 162 | 374 | 390 | 16 |
| BEDB/mPDA | 1,3-diaminobenzene | 144 | 340 | 352 | 12 |
| BEDB/2,4-DT | 2,4-diaminotoluene | 155 | 341 | 357 | 16 |
| BEDB/2,6-DT | 2,6-diaminotoluene | 153 | 356 | 368 | 12 |
| BEDB/2,3-DT | 2,3-diaminotoluene | 160 | 342 | 357 | 15 |
| BEDB/3,4-DT | 3,4-diaminotoluene | 159 | 337 | 347 | 10 |
| BEDB/4-CmP | 4-chloro-1,3-diaminobenzene | 155 | 295 | 332 | 37 |
| BEDB/5-CmP | 5-chloro-1,3-diaminobenzene | 166 | 332 | 336 | 4 |
| BEDB/4-CoP | 4-chloro-1,2-diaminobenzene | 154 | 348 | 352 | 4 |

TABLE B5-continued

Thermal properties of EBHDB epoxy resins cured with various diamines.

| Formulation | Diamine | $T_g$ (°C.) | $T_{di}$ (°C.)[a] | $T_{dmax}$ (°C.)[b] | $\Delta T_d$ ($T_{dmax}$-$T_{di}$) |
|---|---|---|---|---|---|
| BEDB/3,3'-DMB | H₂N—[biphenyl with 3,3'-CH₃]—NH₂ | 169 | 360 | 374 | 14 |
| BEDB/3,3'-DMoB | H₂N—[biphenyl with 3,3'-OCH₃]—NH₂ | 149 | 344 | 366 | 22 |

[a] 5 wt % loss temperature on TGA.
[b] maximum peak temperature of derivative weight curve on TGA.

Thermal degradation of cured epoxies, by dehydration to give vinylene ethers, then cyclization and Claisen rearrangement contributes to char formation and thus flame-retardancy. (See, Levchik et al. *Polym Int* 2004; 53: 1901-1929; Lee et al. *J Polym Sci*, Part A: Polym Chem 1965; 3: 859-882; Paterson-Jones J C. *J Appl Polym Sci* 1975; 19: 1539-1547; Lin et al. *J Polym Sci: Polym Chem Ed* 1979; 17: 3121-3148; Maxwell et al. *Polym Degrad Stabil* 1983; 5: 275-301.) The results for char residue and flammability of all formulations are listed in Table B6. As expected from prior studies of BEDB-based polymers, the BEDB-based epoxy formulations showed significantly higher char yields (~30%) than the BPA-based systems (~16%). Resins cured with meta-DDS gave char yield about 3% higher than the para-DDS cured resin, and the char yields of the meta-aromatic diamine cured resins were at least 10% higher than those of the resins cured with ortho-aromatic diamine, regardless of substituted groups. These results can be attributed to the effect of the presence and position of substituents on the diamines, where cyclization and subsequent char is favored when an ortho-substituent is absent. The effect of cyclization by Claisen rearrangement (Scheme B2), and subsequent charring, has been discussed previously for bisphenol A epoxy resins. Moreover, the char residues of the resins cured with substituted diamines were higher than that of non-substituted amine cured resin. The resin cured with the substituted biphenyls, having the greatest aromatic (least aliphatic) character exhibited the highest char yields, over 40%.

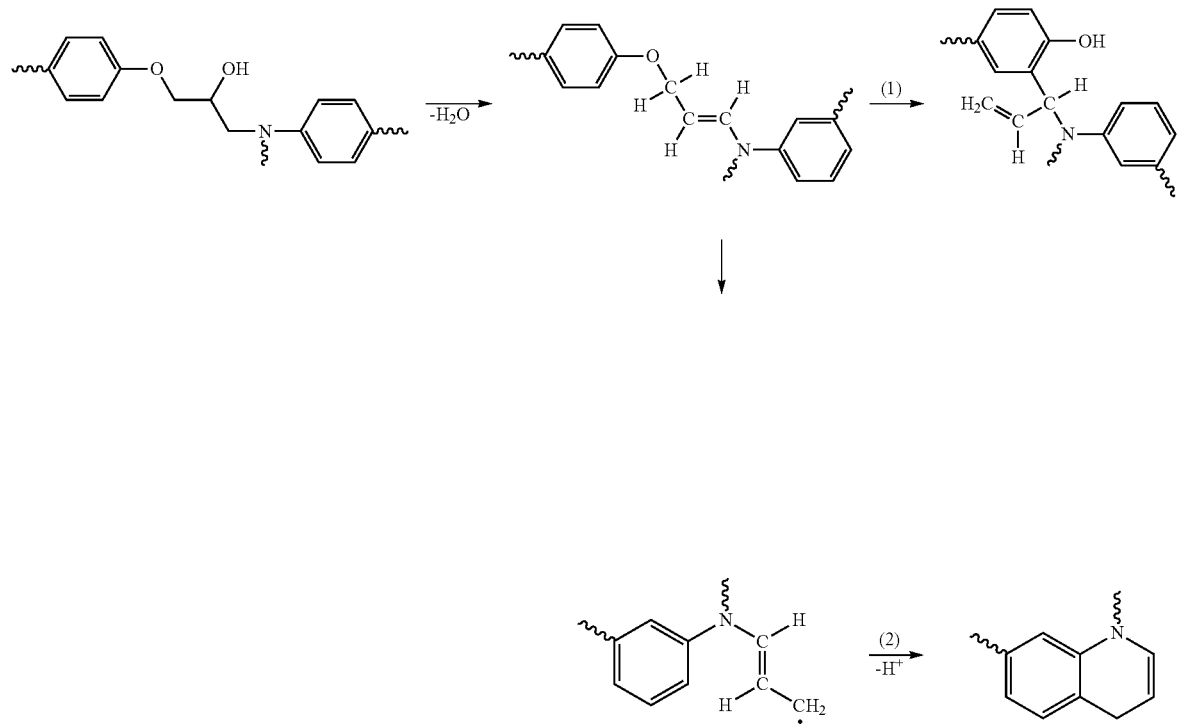

Scheme 2

TABLE B6
Heat release data for BEDB-based epoxy resins cured with various diamines.
| Formulation | Diamine | HRC (J/(gK)) | THR (kJ/g) | Residue (%)[a] |
|---|---|---|---|---|
| EBPA/4,4'-DDM | 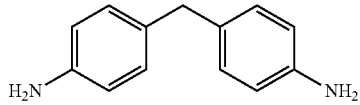 | 737 ± 24 | 26.8 ± 0.4 | 16 |
| BED/4,4'-DDM | 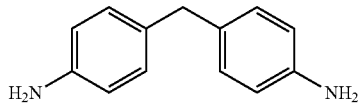 | 439 ± 7 | 17.6 ± 0.2 | 35 |
| BEDB/4,4'-DDS | 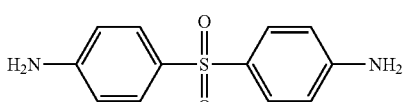 | 420 ± 14 | 17.2 ± 0.2 | 30 |
| BEDB/3,3'-DDS | 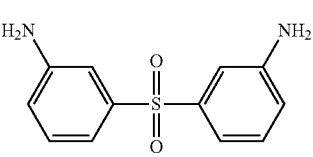 [SMILES: Nc1cccc(S(=O)(=O)c2cccc(N)c2)c1] | 429 ± 19 | 17.2 ± 0.1 | 33 |
| BEDB/mPDA | 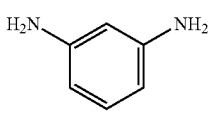 | 391 ± 40 | 19.7 ± 0.8 | 29 |
| BEDB/2,4-DT | 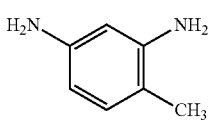 | 372 ± 36 | 17.0 ± 0.4 | 33 |
| BEDB/2,6-DT | 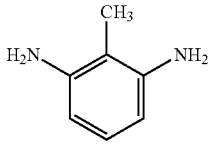 | 530 ± 33 | 17.9 ± 0.4 | 32 |
| BEDB/2,3-DT | 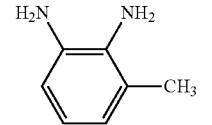 | 326 ± 25 | 20.0 ± 0.3 | 20 |
| BEDB/3,4-DT | 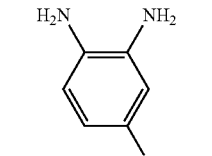 | 415 ± 6 | 20.3 ± 0.1 | 20 |
| BEDB/4-CmP | 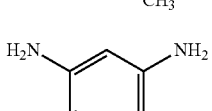 | 169 ± 13 | 15.3 ± 0.3 | 36 |
| BEDB/5-CmP | 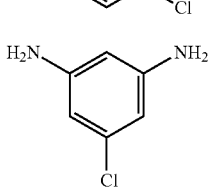 | 292 ± 17 | 15.3 ± 0.3 | 34 |

TABLE B6-continued

Heat release data for BEDB-based epoxy resins cured with various diamines.

| Formulation | Diamine | HRC (J/(gK)) | THR (kJ/g) | Residue (%)[a] |
|---|---|---|---|---|
| BEDB/4-CoP | 4-chloro-1,2-phenylenediamine | 389 ± 22 | 17.6 ± 0.2 | 21 |
| BEDB/3,3'-DMB | 3,3'-dimethyl-4,4'-biphenyldiamine | 400 ± 23 | 17.2 ± 0.1 | 41 |
| BEDB/3,3'-DMoB | 3,3'-dimethoxy-4,4'-biphenyldiamine | 288 ± 7 | 14.8 ± 0.2 | 42 |

[a]Char residues were obtained from TGA at 850° C. in nitrogen (heating rate 10° C./min).

The resins cured with chlorinated diamines showed relatively low HRCs, also shown in Table B6. This reduction of HRC can be explained by gas phase combustion inhibition. BEDB/ortho-diaminophenylchloride systems exhibited higher HRC and THR than resins cured with chlorinated meta-aromatic diamines. The methyl substituted diaminobenzene, BEDB/2,3-diaminotoluene had the lowest value of HRC, but much higher THR than those of the resins cured with meta-diaminobenzenes. Again it appears that substituted meta-system provides an opportunity for higher flame-retardancy than the ortho-case, likely due to more facile intermolecular cyclization reactions during thermal decomposition. Resins cured with substituted biphenyls exhibited higher char residues and flame-retardancy than those cured with DDM, DDS, and mPDA. Specifically, the resin cured with methoxy substituted biphenyl gave HRC and THR significantly lower than the resin cured with the meta-diaminophenylchloride.

c. Diisocyanate Monomer for Non-Halogenated Low-Flammable Polyurethanes

Polyurethanes, an important class of thermoplastics, are synthesized by the polymerization of diisocyanates (or polyisocyanates) with diols (or polyols) in presence of a catalyst. Polyurethane formulations used today cover an extensive range of hardness and densities. Depending on the monomer composition and processing conditions, a variety of polyurethanes can be obtained in the form of foams (rigid or flexible), rubbers, elastomers, coatings or adhesives. (See, Szycher, M. *Handbook of Polyurethanes*; CRC Publishers: Boca Raton, Fla. 1999, 700 pp.; Phillips, et al. *Polyurethanes-Chemistry, Technology and Properties*; Iliffe Books: London, 1964, 129 pp.) Low density flexible polyurethane foams are used in upholstery and bedding, while low density rigid foams are employed as thermal insulation and in automobile dashboards. Gel pads and print rollers utilize soft solid polyurethane elastomers, while hard solid plastics are useful in structural parts.

Polyurethanes belong to reactive processing polymers, in which reactive monomers and oligomers are processed, neat or in solution. For example, the reactive components are processed as liquids for the manufacture of polyurethane foams and elastomers. Reaction injection molding (RIM) technology illustrates in a unique way the reactive processing of liquid polyurethane components, i.e. monomers and oligomers (di- or polyisocyanates). (Schmelzer, et al. *J. Macromol. Sci. Part A. Pure Appl. Chem.* 1997, 34, 2085; Schmelzer, et al. *J. Praktische Chemie/Chemiker-Zeitung* 1994, 336, 483.) RIM combines the processing of liquids and the forming of thermoset parts in a more economical process than injection molding.

FR additives are required for most polyurethane products, especially flexible foams used in upholstery and mattresses. FR additives impede the progress of fire and reduce the amount of heat and smoke released. Halogenated FR additives are useful, cost-effective, and provide improved fire safety of polyurethanes. However, an increasing number of research reports indicate that many halogenated FR additives are persistent and bioaccumulative, and possess significant toxicity concerns. For instance, polybrominated diphenyl ethers (PBDEs), a leading class of halogenated FR additives, accumulate in human blood serum, breast milk, and fish. These findings have generated number of legislations toward restricting and banning the use of brominated flame retardants.

A proactive solution towards elimination of toxic halogenated FR additives would be to embed intrinsic anti-flammable characteristics into the polymer. Another aspect of the invention addresses the problem of polyurethane flammability by the synthesis of deoxybenzoin diisocyanate (DBDI) and its use in the preparation of polyurethanes. The utility of DBDI is demonstrated by synthesizing polyurethanes with two different diols. The thermal properties of these deoxybenzoin-containing polyurethanes were measured and compared to those of conventional polyurethanes synthesized from commercially available diisocyanates, such as 4,4'-methyldiphenyl diisocyanate (MDI) and 2,4-toluene diisocyanate (TDI). Also reported is the synthesis of a deoxybenzoin-based oligomeric hydroxyl compound and its utility as an additive to polyol component in polyurethane foam formulations.

Experimental
DBDI Monomer Synthesis

Several strategies were pursued in attempts to synthesize diaminodeoxybenzoin, a precursor for DBDI. For example, Sonogashira coupling of protected (e.g., t-Boc or trifluorocarbonyl) or unprotected 4-iodoaniline with acetylene gave the corresponding diaminodiphenylacetylene. (See, Fox, et al. *J. Organomet. Chem.* 2003, 680, 155.) However, attempted hydration of the alkyne under various acidic conditions (HCl/H$_2$O, HCl/MeOH, or H$_2$SO$_4$/acetic acid)[20] led to either unreacted starting material or recovery of only insoluble material. Another attempted route involved a Friedel-Crafts reaction of either t-Boc-protected aniline or acetanilide with t-Boc-protected 4-aminophenylacetyl chloride. (See, Arias-Martin, et al. *Macrmol. Reports* 1996, A33, 229; Neubert, et al. *Mol. Cryst. Liq. Cryst.* 1977, 43 (3-4), 313; Kobayashi, et al. *Adv. Synth. Catal.* 2001, 343, 71.) However, this was also unsuccessful despite exploration of numerous different reaction conditions.

Ultimately the route shown in Scheme C1 was chosen, which involves converting an aryl bromide precursor to protected aniline as key step. First, the commercially available 4,4'-dibromobenzil (1) was converted into the corresponding t-Boc-protected diaminobenzil, 2 by copper(I) catalyzed Ullmann-type coupling under conditions reported by Buchwald and coworkers. (See, Klapars, A.; Antilla, J. C.; Huang, X.; Buchwald, S. L. *J. Am. Chem. Soc.* 2001, 123, 7727; Jones, C. P.; Anderson, K. W.; Buchwald, S. L. *J. Org. Chem.* 2007, 72, 7968.) The reaction was carried out with t-butyl carbamate as the ammonia surrogate, CuI catalyst, tribasic potassium phosphate as base, and N,N'-dimethylethylene diamine as ligand in THF at 90° C. in a sealed Schlenk tube for 24 hours. The product was extracted with ethyl acetate and purified by column chromatography to obtain the desired product 2 in 73% yield. The molecular structure was confirmed by $^1$H NMR spectroscopy, in which the resonance for methyl protons of t-Boc groups was seen at 1.50 ppm, aromatic protons centered at 7.78 and 7.89 ppm as multiplets, while the broad signal at 8.98 ppm correspond to the amide protons. $^{13}$C NMR spectroscopy showed a resonance at 194.5 ppm for the carbonyl groups, and the t-Boc signals are found at 153.2 ppm (carbonyl group), 81.1 ppm (tertiary carbon), and 28.4 ppm (methyl group), while the aromatic carbons were found in the expected region (119-153 ppm).

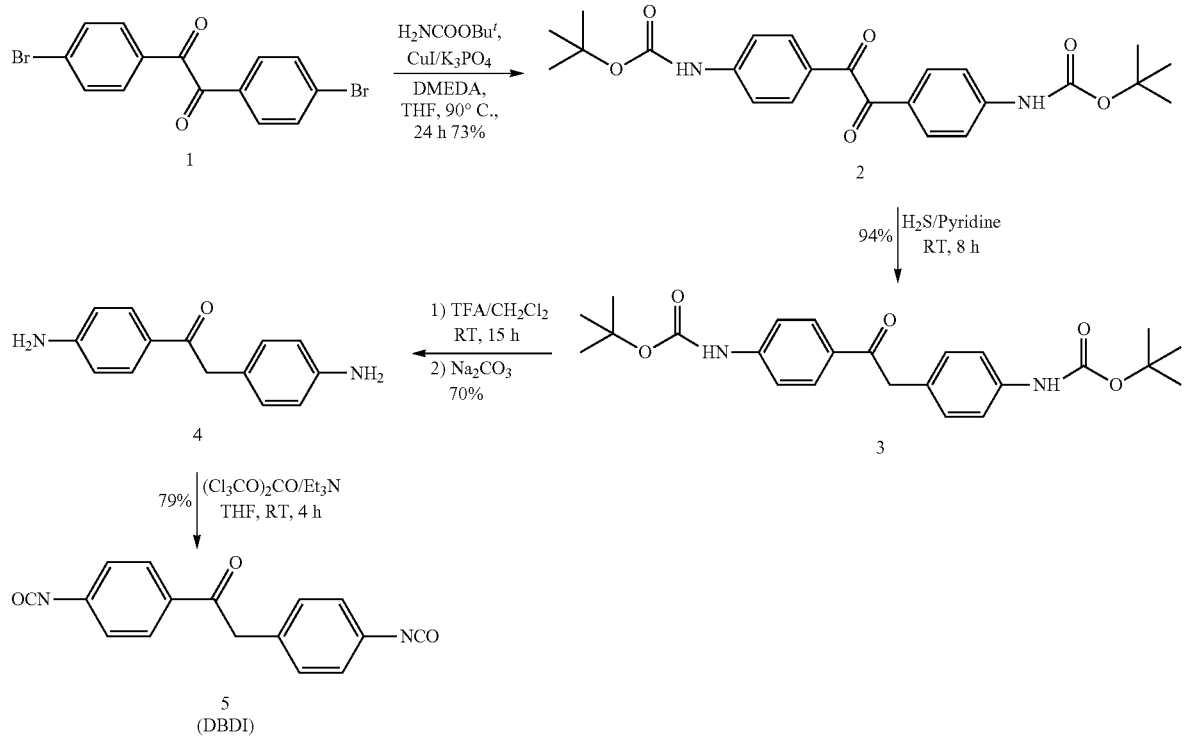

Scheme C1

Reduction of one carbonyl group of 2 using hydrogen sulfide in pyridine gave t-Boc-protected 4,4'-diaminodeoxybenzoin (3) in high yield (94%) after purification by column chromatography. (See Mayer, et al. *Angew. Chem. Int. Ed. Engl.* 1963, 2, 370.) The $^1$H-NMR spectrum of 3 showed singlets at 1.49 and 1.46 ppm for the t-Boc groups attached to the unsymmetrial deoxybenzoin moiety. These signals were helpful in monitoring the conversion of benzil 2 to deoxybenzoin 3, as the methylene group resonance of 3 at 4.23 ppm could be integrated against the t-Boc methyl groups. In the $^{13}$C NMR spectrum of 3, the carbonyl peak was found at 196.6 ppm and a new signal for the methylene group at 44.9 ppm.

Deprotection of 3 to the free diamine was accomplished by stirring with 10-fold excess of trifluoroacetic acid in dichloromethane at room temperature for 24 hours, giving compound 4 in good yield (~70%). The $^1$H NMR spectrum of 4 indicated peaks for methylene protons of deoxybenzoin at 3.99 ppm (shifted from 4.23 ppm in 3) and appearance of amine protons (4.46 and 5.44 ppm) confirming the successful conversion.

Diamine 4 was then converted to the target deoxybenzoin-4,4'-diisocyanate (DBDI, 5) using triphosgene in anhydrous tetrahydrofuran. After removing the unreacted phosgene by washing with anhydrous hexane, pure product was obtained as yellow sold in 79% yield. FT-IR spectroscopy indicated characteristic absorption bands at 2267 and 1747 cm$^{-1}$ (isocyanate group) and 1664 cm$^{-1}$ (CO stretching of deoxybenzoin). $^1$H NMR spectroscopy showed a singlet for the methylene group at 3.99 ppm, and four multiplets for the aromatic protons at 6.60, 6.67, 6.99 and 7.83 ppm. In the $^{13}$C NMR spectrum of DBDI, the carbonyl and methylene carbon resonances of deoxybenzoin appeared at 196 and 43.7 ppm, respectively. The two isocyanate carbons were found at 124.2 and 124.7 ppm. High resolution mass spectrometry (HRMS) indicated molecular ion peak at 278.0684 (calculated 278.0691).

Polyurethane Synthesis

Diisocyanate 5 was then used in polymerization chemistry with various diols to afford polyurethanes. In an attempt to prepare an all-benzoin polyurethane, 4,4'-bishydroxydeoxybenzoin (BHDB) was used as a diol in an $A_2+B_2$ polymerization with DBDI. This attempted polymerization gave only oligomers despite exploring a variety of reaction conditions, including various mole percent of dibutyltin dilaurate, different solvents (NMP, DMSO, and DMF), temperatures from 90-150° C., and reaction times up to 48 hours. None of the conditions that were tried could compensate for the low reactivity of phenols towards aromatic diisocyanates.

Deoxybenzoin-rich polyurethanes were prepared by first extending BHDB to an aliphatic diol, as shown in Scheme C2. BHDB was heated with ethylene carbonate at 180° C. (neat melt) with sodium carbonate as catalyst[27] to afford 6 in excellent yield (94%) and high purity. $^1$H NMR spectroscopy indicated a downfield shift for the methylene proton of deoxybenzoin to 4.20 ppm (4.11 ppm in BHDB). The protons of the ethylene units were seen at 3.72, 3.82, 3.94, and 4.07 ppm, while the hydroxyl protons resonate at 4.84 and 4.91 ppm. $^{13}$C NMR spectroscopy further confirmed the structure with peaks for carbonyl group (196.4 ppm), ethylene spacers (70.0, 69.5, 59.7 and 59.5 ppm), and methylene group of deoxybenzoin (43.6 ppm).

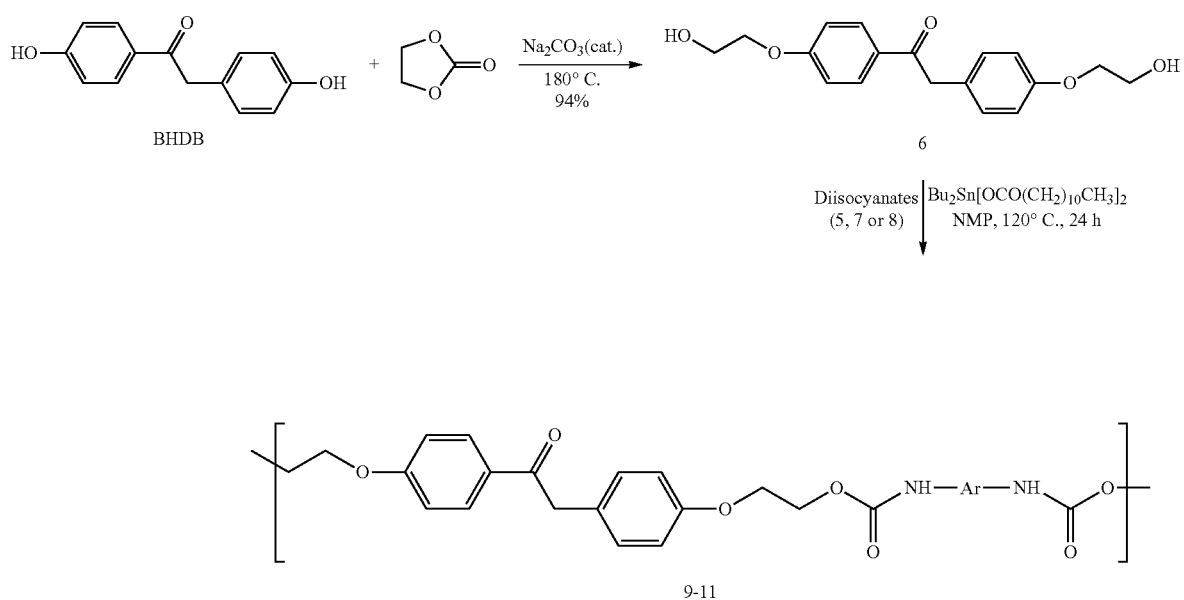

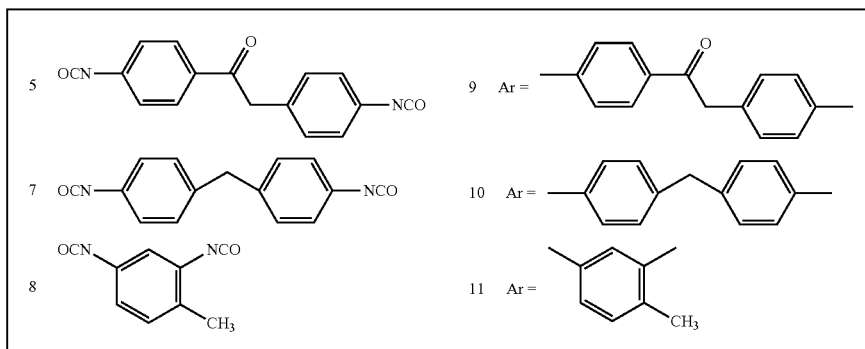

The step-growth polymerizations of deoxybenzoin-diol (6) with DBDI (5), 4,4'-methyldiphenyl diisocyanate (MDI, 7) or 2,4-toluene diisocyanate (TDI, 8) afforded polyurethanes 9-11 respectively, as shown in Scheme C2. All the reactions were carried out using dibutyltin dilaurate catalyst in N-methylpyrrolidone (NMP) at 120° C. for 24 hours. The polymers were then purified by precipitating into methanol. $^1$H NMR spectrum of polyurethane 9 (synthesized from DBDI, 5 and deoxybenzoin-diol, 6) showed deoxybenzoin methylene protons of diisocyanate at 4.0 ppm and that of diol at 4.21 ppm. The protons of the ethylene spacers resonate as triplets at 3.69, 3.73, 3.93 and 4.06 ppm. The urethane NH protons were found at 8.58 and 9.75 ppm as broad singlets and the aromatic protons were in the region of 6.9-8.0 μm with expected integration ratios. FT-IR spectrum showed typical urethane absorption bands at 3322 cm$^{-1}$ (N—H stretching) and 1714 cm$^{-1}$ (CO stretching) along with the carbonyl stretching band of deoxybenzoin unit at 1672 cm$^{-1}$. GPC measurements using DMF as mobile phase and polystyrene standards as calibration showed weight average molecular weights ($M_w$) were in the range of ~20,000 g/mol for all the polyurethanes with PDI ~1.6 (Table C1).

Further demonstrating the polymerization chemistry of DBDI, a simple aliphatic diol (eg., 1,3-propanediol, 12) was used for the synthesis of deoxybenzoin-containing polyurethanes (Scheme C3) using the same reaction conditions described above. These novel polyurethanes were compared to those prepared using MDI and TDI in place of DBDI. The molecular structural characterization was done by FT-IR and $^1$H NMR spectroscopy. In FT-IR, the polyurethane 13 (prepared from DBDI and 1,3-propanediol), exhibited strong absorption bands at 1708 cm$^{-1}$ (carbonyl stretching) and 3318 cm$^{-1}$ (NH stretching) for the urethane linkage. The carbonyl stretching of deoxybenzoin unit was found at 1675 cm$^{-1}$. Proton-NMR spectroscopy revealed peaks at 2.06 (multiplet, 2H) and 4.16 ppm (triplet, 4H) for the propanediol component, while the methylene protons of deoxybenzoin resonate at 4.21 ppm as singlet. The aromatic protons are found as four multiplets at 7.14, 7.35, 7.66, and 7.99 ppm, each accounting for two protons. The urethane NH protons were found as broad singlets at 9.61 and 10.1 ppm. The molecular weight characterization by GPC (DMF as mobile phase and calibrated against polystyrene standards) indicated reasonably high molecular weights for all the polyurethanes with weight average molecular weight ($M_w$) in the range of 22,000-35,000 g/mol and PDI=1.3-1.8 following the purification procedures, i.e., precipitation into methanol (Table C1).

Scheme C3

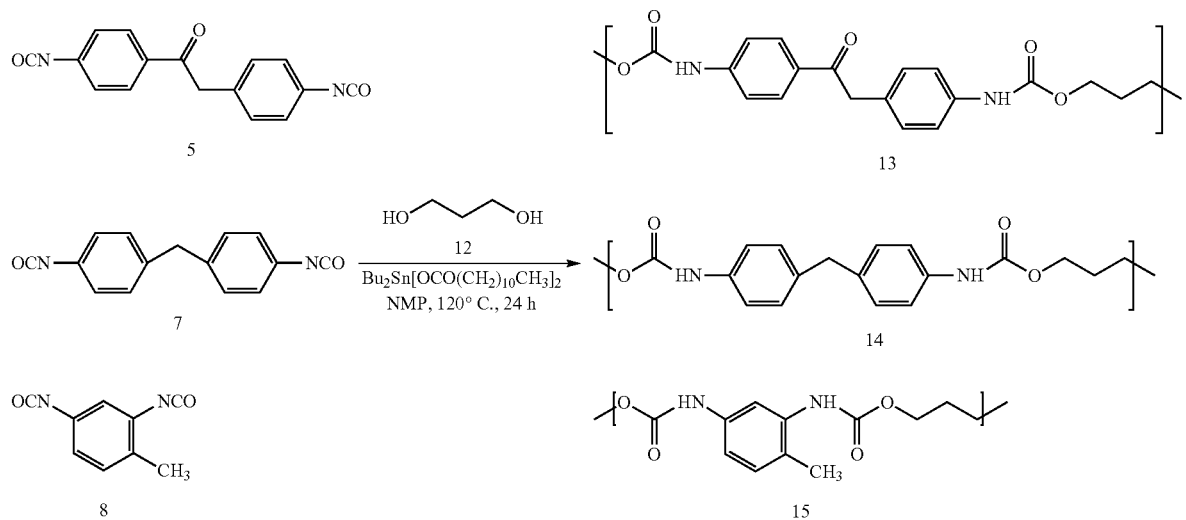

TABLE C1

Gel Permeation Chromatography data for polyurethanes

| Polyurethane | Diisocyanate | Diol | $M_w$ (g/mol) | $M_n$ (g/mol) | PDI |
|---|---|---|---|---|---|
| 9 | DBDI | 6 | 18,800 | 11,000 | 1.71 |
| 10 | MDI | 6 | 17,200 | 13,000 | 1.32 |
| 11 | 2,4-TDI | 6 | 15,600 | 9,600 | 1.63 |
| 13 | DBDI | 12 | 22,000 | 15,000 | 1.46 |
| 14 | MDI | 12 | 25,000 | 16,500 | 1.52 |
| 15 | 2,4-TDI | 12 | 34,900 | 24,900 | 1.40 |

[a] GPC measurements done in DMF solvent against polystyrene standards

Thermal and Heat Release Measurements

The heat release and fundamental thermal properties of the polyurethanes described above were measured by pyrolysis combustion flow calorimetry (PCFC), thermogravimetric analysis (TGA) and differential scanning calorimetry (DSC). PCFC is an oxygen consumption calorimetry method that measures heat release capacity (HRC) and total heat release (THR) of polymer materials in milligram sample sizes. (See, Walters, et al. *J. Appl. Polym. Sci.* 2003, 87, 548.) HRC is the peak heat release rate normalized to the heating rate, while THR is defined as the heat of complete combustion of the pyrolysis gases per unit initial mass of a material. HRC is an inherent material property and hence a good predictor of the flammability of polymers. TGA provides the onset of decomposition temperatures along with char residues, while glass transition temperatures ($T_g$) are obtained by DSC (Table C2).

TABLE C2

Flammability and thermal characteristics of polyurethanes

| | | | PCFC | | TGA | | DSC |
|---|---|---|---|---|---|---|---|
| Polymer | Diisocyanate | Diol | HRC (J/g-K) | THR (kJ/g) | $T_d$ (° C.)[a] | Char yield (%)[b] | $T_g$ (° C.)[c] |
| 9 | DBDI | 6 | 128 ± 2 | 11.1 ± 0.2 | 279 | 38 ± 1 | 134 |
| 10 | MDI | 6 | 215 ± 5 | 18.4 ± 0.3 | 259 | 23 ± 1 | 68 |
| 11 | 2,4-TDI | 6 | 238 ± 6 | 16.6 ± 0.4 | 258 | 25 ± 1 | 75 |
| 13 | DBDI | 12 | 141 ± 7 | 13.1 ± 0.3 | 247 | 26 ± 1 | 156 |
| 14 | MDI | 12 | 349 ± 10 | 22.8 ± 0.2 | 205 | 9 ± 1 | 110 |
| 15 | 2,4-TDI | 12 | 570 ± 12 | 20.8 ± 0.2 | 256 | 8 ± 1 | 119 |

[a] Decomposition temperatures at 5% weight loss;
[b] Char yield at 800° C.;
[c] Glass transition temperatures measured during $2^{nd}$ heating scan.

PCFC studies showed that the polyurethanes derived from MDI or TDI with 1,3-propanediol as the diol component possess high flammability characteristics as seen from their large HRC (~350-550 J/g-K) and THR (~22 kJ/g) values. Replacement of MDI or TDI with DBDI in these polyurethane systems reduces HRC and THR to 140 J/g-K and 13 kJ/g, respectively. Substitution of aliphatic diol (12) with a deoxybenzoin-containing diol (6) in MDI or TDI-based polyurethanes converts them from highly flammable into moderately flammable with a reduced HRC (~250 J/g-K) and THR (~17 kJ/g). The very best fire-resistance characteristics were obtained for the polyurethane synthesized from DBDI and deoxybenzoin-diol, where the percentile of deoxybenzoin units was highest in the polymer backbone. This polyurethane (9) possesses HRC of 128 J/g-K and THR of 11 kJ/g.

TGA studies performed in nitrogen atmosphere indicated that the decomposition temperatures of all the polyurethanes at 5% weight loss were in the range of about 250° C. DBDI-containing polyurethanes showed exceptionally large char yields, measured at 800° C., as compared to the MDI and TDI analogs. In propanediol-based polyurethanes, replacement of MDI or TDI increases the char yield from ~10% to 26%. Similarly, MDI and TDI-based polyurethanes afforded higher char yields (~25%) when the diol component was deoxybenzoin-diol (6). In case of polyurethane synthesized from DBDI and deoxybenzoin-diol, possessing maximum deoxybenzoin content, the char yield reached highest value of 38%. Taking into account of its low HRC (~128 J/g-K) and HRR (11 kJ/g) along with the high char residue indicates the ultra-flame-resistance character of this polyurethane.

DSC studies demonstrated the amorphous nature of all the polyurethanes, as seen from the observation of only glass transition temperature ($T_g$) when the heating cycle was carried out up to 250° C. In the class of polyurethanes prepared from 1,3-propanediol, DBDI-based polyurethane exhibited $T_g$ of 156° C., whereas the MDI and TDI-based polyurethanes showed relatively lower temperatures of 110 and 119° C., respectively. In a similar trend, in the category of polyurethanes prepared from deoxybenzoin-diol (6), MDI and TDI-based polyurethanes showed $T_g$ (68 and 75° C. respectively) much lower than the corresponding DBDI-based one (134° C.). These trends indicate that the deoxybenzoin unit brings more rigidity to the polymeric backbone thereby increasing the glass transition temperatures.

Polyurethane Foam Synthesis

A typical industrial process of polyurethane foam synthesis involves the reaction of polymeric diisocyanates (eg. MDI or TDI-based prepolymer) with a polyol (polyether or polyester-based) using a foaming agent (eg. water) and an amine or organometallics-based catalyst. Rigid or flexible foams are obtained by varying the nature, functionality, and molecular weight of polyols employed. Addition of chain extenders and cross linkers (low molecular weight hydroxyl and amine terminated compounds) also play an important role in determining the final morphology of polyurethane foams as fibers, elastomers or adhesives.

An additive approach was employed utilizing deoxybenzoin-based molecules to reduce the flammability of polyurethane foams. Although an initial experiments with BHDB as an additive to the polyol component in the synthesis of polyurethane foams were successful in reducing the heat release rates, the nature of the resulting foam was altered. An oligomeric deoxybenzoin-based hydroxyl compound was designed as an alternative to small molecule like BHDB. This oligomeric version is expected to mix better with the polyol without affecting the inherent properties of final foam product. Thus, the target oligomeric polyether (17) was synthesized in two steps starting from BHDB as shown in Scheme C4.

In the first step, BHDB was reacted with ditosyl protected 1,3-propanediol using potassium carbonate as base in acetone to obtain the oligomer containing tosyl end groups (16) in 65% yield. The product was characterized by $^1$H NMR spectroscopy. The methylene protons of the deoxybenzoin unit changed from a clear singlet at 4.1 ppm to several singlet peaks in the region of 3.8-4.0 ppm indicating the formation of oligomer. The two methylene protons connected to oxygen atoms of the spacer resonate at 4.15-4.22 ppm as broad peaks. The other (middle) methylene protons appear at 2.1 ppm and the methyl protons of the tosyl group were found at 2.4 ppm as singlet. The aromatic protons were observed in the region of 6.7-8.0 ppm. GPC studies, in THF solvent (calibrated against polystyrene standard), of the tosyl terminated oligomer showed multimodal peak centered on $M_w$~1400 g/mol indicating the presence of tetramers and pentamers.

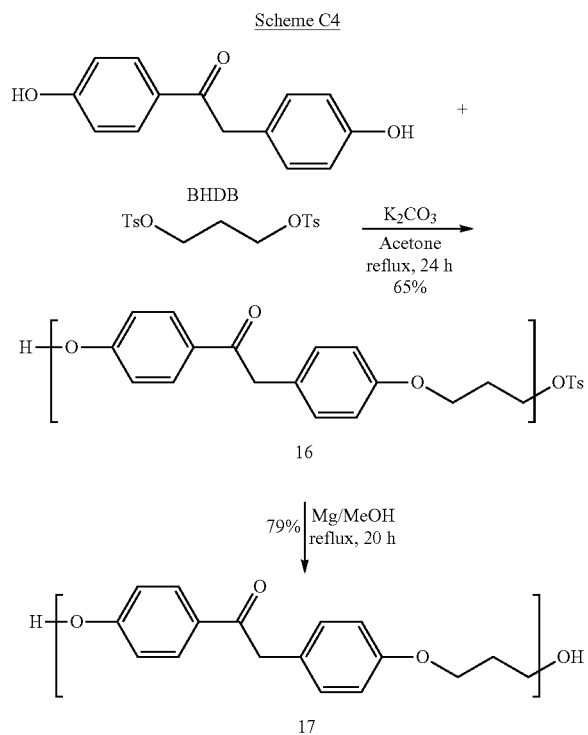

The deprotection of tosyl groups was carried out by reacting 16 with magnesium turnings in methanol at room temperature for 12 h. The reaction mixture was then quenched with dil. HCl and extracted with chloroform to obtain the final product 17 as a white powder in 79% yield. NMR spectrum of this product showed the absence of methyl group of the tosyl group at 2.4 ppm indicating the completion of deprotection reaction. The peaks at 3.8-4.0 ppm correspond to the methylene protons of the deoxybenzoin unit, while the methylene protons of the propane spacer were found at 4.1-4.2 ppm and 2.1 ppm. GPC studies (THF-solvent; polystyrene-standard) showed not much appreciable change in the molecular weight ($M_w$~1200 g/mol) after the deprotection step.

Polyurethane foams were then synthesized by the reaction of MDI-prepolymer with polyether polyol using 1,4-diazabicyclo[2.2.2]octane (DABCO) and dibutyktindilaurate as catalysts, silicone surfactant and water as foaming agent.

Figure 5:
FIG. 5 shows certain exemplary polyurethane foam formulations and flammability data.

BHDB-oligomer (17) was added to the polyether polyol component and varied to study its effect on the flammability of the resulting polyurethane foams. Introduction of about 13 weight % of the BHDB-oligomer reduced the HRC of pure polyurethane foam from 476 J/g-K to 437 J/g-K and induced 15% of char yield as against no char from the original foam (Table C3 and FIG. 5). Notably, the integration of BHDB-oligomer did not alter significantly the elastomeric behavior of the original foam product. Increasing the BHDB-oligomer content to ~22% increased the char further (~20%) and also caused further reduction in HRC (370 J/g-K) and THR (20 kJ/g). At this level of BHDB-oligomer, there is a noticeable reduction of the dripping behavior when the foam is burned over an open flame.

TABLE C3

Polyurethane foam formulations and flammability data

| | Reagents (weight %) | | | | PCFC | | TGA |
| | Poly- | | MDI- | | | | Char |
| Polymer | ether polyol | BHDB-oligomer | pre-polymer | Others[a] | HRC (J/g-K) | THR (kJ/g) | yield (%)[b] |
|---|---|---|---|---|---|---|---|
| 18 | 74.9 | 0 | 23.1 | 2.0 | 476 | 22.9 | 0 |
| 19 | 62.6 | 12.6 | 22.8 | 2.0 | 437 | 21.1 | 15 |
| 20 | 53.6 | 21.6 | 22.8 | 1.9 | 371 | 19.9 | 19 |

[a]Others include catalysts (DABCO, Dibutyltindilaurate), surfactant and foaming agent (water);
[b]Char yield at 700° C.

Thus, in this example, a novel diisocyanate monomer based on deoxybenzoin (DBDI) is synthesized for low-flammable polyurethanes. The synthetic method utilizes amidation of aryl bromide as a key step and the monomer was obtained in very good yields in large scale reaction batches (>20 g). Integration of DBDI into polyurethane structures affords ultra-fire-resistance as evidenced from the extremely low heat release rates and high char yields. Polyurethane foams were also synthesized by employing BHDB-based oligomeric hydroxyl compound as part of polyol component that induced considerable char formation combined with a reduction of heat release capacity. These methods of imparting flame-resistance using deoxybenzoin-based compounds present a viable strategy to achieve low flammability as well as to avoid the use of environmentally toxic halogenated flame retardant additives. The results obtained here indicate a very good potential for DBDI to partially/fully replace the commercial diisocyanate monomers like MDI and TDI.

Materials:

Ethylene carbonate, t-butyl carbamate, N,N'-dimethylethylene diamine, potassium phosphate (tribasic), copper (I) iodide, triphosgene, hydrogen sulfide gas, pyridine, 1,3-propanediol, MDI, 2,4-TDI, dibutyltin dilaurate, and N-methylpyrrolidone (anhydrous), were purchased from Sigma-Aldrich and used as received.

Instrumentation:

$^1$H and $^{13}$C NMR spectra were recorded using Bruker Avance400 spectrometer operating at the appropriate frequencies using residual solvent as internal reference. Infrared spectra were obtained on a Perkin Elmer Spectrum One FT-IR spectrometer equipped with an ATR accessory. HRMS-FAB data was acquired on a JEOL JMS 700 mass spectrometer. Molecular weights and polydispersity indices were measured by gel permeation chromatography (GPC) in DMF relative to polystyrene standards on systems equipped with two-column sets (Polymer Laboratories) and refractive-index detectors (HP 1047A) at 50° C. with a flow rate of 0.75 mL/min.

Flammability characteristics of the polymers such as heat release capacity was measured using pyrolysis combustion flow calorimetry (PCFC), where the average of three samples of 1-5 mg were pyrolyzed in nitrogen to 900° C. at a rate of 1° C./s, followed by complete combustion at 900° C. Thermogravimetric analysis (TGA) was performed in nitrogen atmosphere on a DuPont TGA 2950 using a ramp rate of 10° C./min. Differential scanning calorimetry (DSC) measurements were performed on a DuPont Instrument DSC 2910 at a scan rate of 10° C./min under a flow of nitrogen (50 mL/min). Glass transition temperatures ($T_g$) data were collected during the second heating from room temperature.

Synthesis of t-Boc-Protected 4,4'-Diaminobenzil (2)

A Schlenk flask was thoroughly flame-dried under vacuum and then under nitrogen atmosphere (three cycles each). To this was added copper (I) iodide (4.14 g, 22 mmol), tribasic potassium phosphate (46.2 g, 220 mmol), and t-butyl carbamate (13.92 g, 119 mmol). These reagents were dried under vacuum and back-filled with nitrogen (three cycles). To this was added 4,4'-dibromobenzil, 1 (20 g, 54 mmol), N,N'-dimethylethylenediamine (3.82 g (4.7 mL), 43 mmol) and anhydrous THF (100 mL). The reaction flask was sealed under nitrogen and heated at 90° C. for 24 h. After bringing down to room temperature, the reaction mixture was passed through silica gel to remove the copper salts. The product was extracted with ethyl acetate and purified by column chromatography using 1:4 mixtures of ethyl acetate and hexane as eluant to obtain yellow crystalline solid. Yield: 17.5 g (73%). Mp. 207° C. $^1$H NMR (acetone-$d_6$, 400 MHz): 1.50 (s, 18H), 7.78 (m, 4H), 7.89 (m, 4H), 8.98 (bs, 2H). $^{13}$C NMR (acetone-4, 100 MHz): 194.5, 153.2, 146.9, 131.3, 128.0, 118.5, 81.1, 28.4. FT-IR (cm$^{-1}$): v 3332, 2925, 1682, 1598, 1509, 1455, 1414, 1368, 1313, 1221, 1169, 1144, 1050, 996, 914, 885, 830, 771. HRMS-FAB: m/z M$^+$ calcd 440.1947. found 440.1938.

Synthesis of t-Boc-Protected 4,4'-Diaminodeoxybenzoin (3)

In a two-neck round bottom flask were taken t-Boc-protected 4,4'-diaminobenzil, 2 (17.5 g, 40 mmol) and 200 mL of pyridine. Hydrogen sulfide gas was bubbled through a septum and the outlet of the reaction vessel was connected to a trap containing aqueous sodium hydroxide solution (10%) to quench the unreacted H$_2$S gas. As the reaction progressed, the solution changes from pale yellow to deep red in color and a separation of yellow solid (sulfur) was observed. As the $R_f$ values of both starting material and product were very similar, it was difficult to follow the reaction progress by TLC. Monitoring the reaction by $^1$H NMR indicated that the reaction was complete after 8 h of H$_2$S-bubbling. After removing the excess pyridine under reduced pressure, the residue was poured into dilute hydrochloric acid (5%) and the resulting off-white solid was filtered. Further washing with water, drying under vacuum, and then purification by column chromatography (1:5 mixtures of ethyl acetate and hexane) afforded the product as white fluffy solid. Yield: 16 g (94%). Mp. 203° C. $^1$H NMR (acetone-$d_6$, 400 MHz): 1.49 (s, 9H), 1.46 (s, 9H), 4.23 (s, 2H), 7.21 (m, 2H), 7.48 (m, 2H), 7.66 (m, 2H), 8.02 (m, 2H), 8.34 (bs, 1H), 8.79 (bs, 1H). $^{13}$C NMR (acetone-$d_6$, 100 MHz): 196.6, 153.7, 153.4, 145.1, 139.1, 131.7, 130.7, 130.6, 130.2, 119.1, 118.1, 80.7, 79.8, 44.9, 28.5, 28.4. FT-IR (cm$^{-1}$): v 3371, 2977, 1705, 1682, 1605, 1525, 1502, 1409, 1392, 1368, 1319, 1235, 1121, 1155, 1057, 996, 904, 826, 772. HRMS-FAB: m/z M$^+$ calcd 426.2155. found 426.2136.

Synthesis of 4,4'Diaminodeoxybenzoin (4)

To an ice-cooled solution of t-Boc-protected 4,4'-diaminodeoxybenzoin, 3 (16 g, 37.6 mmol) in 200 mL of anhydrous dichloromethane was added trifluoroacetic acid (38.9 g (25 mL), 336.6 mmol) dropwise. During the addition, the solution became clear and color of the reaction mixture turned from yellow to red and it was stirred at room temperature for 24 h. A brown solid (ammonium salt) separates out during the course of the reaction. It was then filtered, washed with dichloromethane to remove organic soluble impurities. The solid so obtained was then dissolved in water, neutralized by addition of sodium carbonate, and the precipitated product was extracted with ethyl acetate. The organic layers were combined, washed with water, dried over anhydrous magnesium sulfate and concentrated to get brown solid. Yield=5.9 g (70%). Mp. 137° C. NMR (acetone-$d_6$, 400 MHz): 3.99 (s, 2H), 4.46 (bs, 2H), 5.44 (bs, 2H), 6.60 (m, 2H), 6.67 (m, 2H), 6.99 (m, 2H), 7.83 (m, 2H). $^{13}$C NMR (acetone-$d_6$, 100 MHz): 196.2, 154.2, 147.6, 131.8, 130.7, 126.5, 120.2, 115.2, 113.7, 44.5. FT-IR (cm$^{-1}$): v 3329, 3228, 1682, 1659, 1627, 1589, 1565, 1514, 1437, 1329, 1302, 1229, 1171, 991, 807, 772. HRMS-FAB: m/z [M+1]$^+$ calcd 227.1106. found 227.1176.

Synthesis of 4,4'-Deoxybenzoin Diisocyanate (5)

In a previously flame-dried 2-neck round-bottom flask was taken 4,4'-diaminodeoxybenzoin, 4 (4 g, 17.7 mmol). This was dried under vacuum for 3-4 h and then purged with nitrogen. To this was added triphosgene (3.7 g, 12.5 mmol), anhydrous triethylamine (1.26 g (1.8 mL), 12.5 mmol) and anhydrous THF (60 mL). The mixture was stirred at room temperature for 4 h. After removing the excess solvent under reduced pressure, the side product triethylamine hydrochloride was removed by washing with anhydrous dichloromethane under nitrogen atmosphere. Further drying under vacuum afforded the product as a pale brown solid. Yield=3.9 g (79%). $^1$H NMR (acetone-$d_6$, 400 MHz): 3.99 (s, 2H), 6.60 (m, 2H), 6.67 (m, 2H), 6.99 (m, 2H), 7.83 (m, 2H). $^{13}$C NMR (DMSO-$d_6$, 100 MHz): 196.0, 145.7, 139.0, 138.8, 131.5, 130.5, 124.7, 124.2, 118.01, 116.3, 112.5, 43.7. FT-IR (cm$^{-1}$): v 3312, 2978, 2603, 2497, 2267, 1747, 1664, 1599, 1523, 1475, 1409, 1308, 1220, 1180, 1157, 1036, 993, 830, 761. HRMS-FAB: m/z M$^+$ calcd 278.0691. found 278.0684.

Synthesis of 4,4'-[Bis-(2-Hydroxyethoxy)]deoxybenzoin (6)

In a 2-neck 100 mL round-bottom flask, 4,4'-bishydroxydeoxybenzoin (3 g, 13.15 mmol), ethylene carbonate (2.43 g, 27.6 mmol) and sodium carbonate (0.1 g, 0.9 mmol) were heated at 180° C. for 4 h. The melt was then cooled to room temperature and the solidified product was washed with water to get pale yellow solid. Yield: 3.9 g (94%). Mp. 130° C. $^1$H NMR (400 MHz, DMSO-$d_6$, ppm): 3.72 (m, 4H), 3.94 (t, 2H), 4.07 (t, 2H), 4.21 (s, 2H), 4.84 (t, 1H), 4.91 (t, 1H), 6.86 (m, 2H), 7.03 (m, 2H), 7.16 (m, 2H), 8.0 (m, 2H). $^{13}$C NMR (DMSO-$d_6$, 100 MHz): 196.4, 162.7, 157.4, 130.8, 130.6, 129.2, 127.3, 114.4, 114.2, 70.0, 69.5, 59.7, 59.5, 43.6. FT-IR (cm$^{-1}$): v 3347, 2953, 1682, 1599, 1512, 1454, 1417, 1334, 1302, 1220, 1172, 1043, 995, 912, 828, 772, 674. HRMS-FAB: m/z [M+1]$^+$ calcd 317.1311. found 317.1391.

General Procedure for the Synthesis of Polyurethanes

In a flame-dried 2-neck round-bottom flask were taken diisocyanate (1 equiv.), diol (1 equiv.) and dibutyltin dilaurate (0.1 equiv.) in anhydrous N-methyl pyrrolidone (10 mL for 2 g of diisocyanate batch). The mixture was heated at 120° C. for 24 h. After cooling down to room temperature, the reaction mixture was added drop-wise to an excess of methanol (~1 L). The precipitate so obtained was washed with methanol, then with water and again with methanol to obtain off-white or pale yellow solid as the product.

Data for Polyurethanes:

9 (DBDI+deoxybenzoin diol, 6):

Yield: 70%. $^1$H NMR (DMSO-$d_6$, 400 MHz): 3.69 (t, 2H), 3.73 (t, 3.93 (t, 2H), 4.06 (t, 2H), 4.0 (s, 2H), 4.21 (s, 2H), 6.88 (m, 2H), 7.05 (m, 2H), 7.16 (m, 4H), 7.37 (m, 2H), 7.60 (m, 2H), 7.99 (m, 4H), 8.58 (bs, 1H), 9.75 (bs, 1H). FT-IR (cm$^{-1}$): ν 3322, 2930, 1714, 1672, 1597, 1512, 1414, 1314, 1216, 1172, 1061, 993, 922, 833.

10 (MDI+deoxybenzoin diol, 6):

Yield: 64%. NMR (DMSO-$d_6$, 400 MHz): 3.79 (m, 4H), 3.92 (t, 2H), 4.05 (t, 2H), 4.22 (s, 2H), 6.6 (m, 2H), 6.8 (m, 2H), 7.05 (m, 4H), 7.35 (m, 4H), 7.16 (m, 2H), 8.00 (m, 2H), 8.53 (bs, 1H), 9.71 (bs, 1H). FT-IR (cm$^{-1}$): ν 3312, 2927, 1704, 1678, 1597, 1537, 1510, 1413, 1305, 1220, 1173, 1110, 1059, 995, 916, 818, 771.

11 (TDI+deoxybenzoin diol, 6):

Yield: 70%. $^1$H NMR (DMSO-$d_6$, 400 MHz): 2.12 (s, 3H), 3.93 (t, 2H), 4.07 (t, 2H), 4.18 (t, 2H), 4.23 (s, 2H), 4.32 (t, 2H), 6.70 (m, 2H), 7.02 (m, 3H), 7.17 (m, 3H), 7.52 (m, 1H), 8.01 (m, 2H), 8.98 (bs, 1H), 9.72 (bs, 1H). FT-IR (cm$^{-1}$): ν 3327, 2924, 2855, 1702, 1682, 1598, 1536, 1509, 1453, 1418, 1333, 1220, 1172, 1109, 1075, 1049, 995, 914, 892, 830, 805, 777.

13 (DBDI+propanediol, 12):

Yield: 50%. $^1$H NMR (DMSO-$d_6$, 400 MHz): 2.06 (m, 2H), 4.16 (t, 4H), 4.21 (s, 2H), 7.14 (d, 2H), 7.35 (d, 2H), 7.66 (d, 2H), 7.99 (d, 2H), 9.61 (bs, 1H), 10.1 (bs, 1H). FT-IR (cm$^{-1}$): ν 3318, 2976, 1708, 1675, 1592, 1527, 1413, 1316, 1218, 1178, 1064, 994, 833, 765.

14 (MDI+propanediol, 12):

Yield: 88%. $^1$H NMR (DMSO-$d_6$, 400 MHz): 1.97 (m, 2H), 3.78 (s, 2H), 4.16 (t, 4H), 7.08 (d, 4H), 7.35 (d, 4H), 9.56 (bs, 2H). FT-IR (cm$^{-1}$): ν 3322, 2967, 1703, 1597, 1527, 1412, 1309, 1220, 1114, 1064, 1018, 813, 772.

15 (TDI+propanediol, 12):

Yield: 55%. $^1$H NMR (DMSO-$d_6$, 400 MHz): 1.98 (m, 2H), 2.12 (s, 3H), 4.17 (t, 4H), 7.07 (m, 1H), 7.16 (m, 111), 7.52 (s, 111), 8.83 (bs, 1H), 9.58 (bs, 1H). FT-IR (cm$^-$): ν 3312, 2965, 1704, 1600, 1532, 1455, 1416, 1226, 1064, 1000, 879, 815.

Synthesis of BHDB-Oligomer with Tosyl End Groups (16)

In a previously flame-dried 250 mL round-bottom flask were taken BHDB (13.5 g, 57 mmol), 1,3-propanediol di-p-tosylate (25 g, 65 mmol) and potassium carbonate (23.6 g, 171 mmol) in 150 mL of acetone. The mixture was refluxed for 24 h. After bringing down to room temperature, the reaction mixture was filtered and extracted with acetone. Evaporation of the solvent under reduced pressured afforded the product as white sticky solid. Yield: 10.3 g (65%). $^1$H NMR (DMSO-$d_6$, 400 MHz): 2.09 (m, 2H), 2.4 (s, 3H), 3.9-4.0 (m, 2H), 4.15-4.22 (m, 4H), 6.7-8.0 (m, 12H). GPC (THF, PS standard): $M_w$=1400 g/mol; $M_w$=1000 g/mol; PDI=1.40.

Synthesis of BHDB-Oligomer with Hydroxyl End Groups (17)

In a previously flame-dried 250 mL round-bottom flask were taken 16 (10 g, 10 mmol), magnesium turnings (2.4 g, 100 mmol) and anhydrous methanol (60 mL). The reaction mixture was heated initially in order to dissolve the magnesium in methanol, after which stirred at room temperature for 20 h. The reaction was quenched with cold 5% HCl (aqueous) to obtain a white precipitate. This was filtered, washed with water and dried. Soxhlet extraction with chloroform afforded the product as white solid. Yield: 5.2 g (79%). $^1$H NMR (acetone-$d_6$, 400 MHz): 2.1 (m, 2H), 3.8-4.0 (m, 2H), 4.1-4.2 (m, 4H), 6.7-8.0 (m, 8H). GPC (THF, PS standard): $M_w$=1200 g/mol; $M_w$=800 g/mol; PDI=1.49.

d. BHDB-Containing Polyarylates

BHDB-containing copolymers can be made by copolymerization of BHDB, BPA and, for example, isophthaloyl chloride as shown in Scheme D1. Various ratios of BHDB to BPA can be employed, for example, about 1:1 to about 5:1 (e.g., about 1:1, 2:1, 3:1, 4:1, 5:1) and great than about 5:1.

Scheme D1

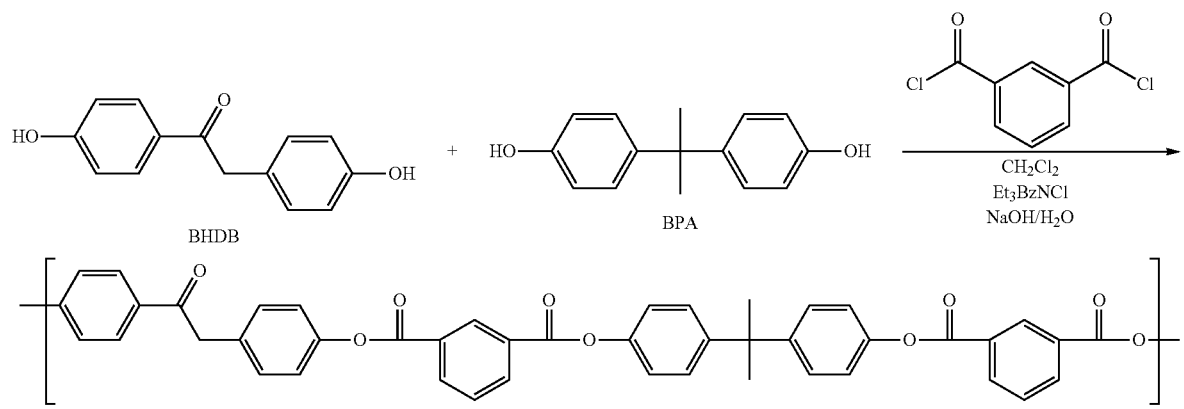

Flame Resistance Tests

Materials

Bishydroxydeoxybenzoin (BHDB)/Bisphenol-A (BPA) polyarylate was supplied as a single 125×65×3.2 mm plaque, dark amber or brown in color. Standard bar specimens for flame resistance testing were cut from the plaque having the dimensions and weight in Table D1.

TABLE D1

BHDB/BPA Polyarylate Specimen Size and Weight

| BHDB/BPA Specimen No. | Specimen Dimensions (mm) | Initial Mass (g) |
| --- | --- | --- |
| 1 | 13 × 125 × 3.2 | 5.3 |
| 2 | 13 × 124 × 3.2 | 5.2 |
| 3 | 13 × 124 × 3.2 | 5.4 |
| 4 | 13 × 124 × 3.2 | 5.6 |
| 5 | 11.5 × 124 × 3.2 | 4.9 |

Methods

1. Standard Test Method for Measuring the Comparative Burning Characteristics of Solid Plastics in a Vertical Position, ASTM D 3801-06, American Society for Testing and Materials, West Conshohocken, Pa. ANSI/UL94 (V-0, V-1, or V-2) are equivalent. The procedure consists of subjecting a set of 5 preconditioned specimens of identical composition and geometry to a standard test flame for two, 10-s flame applications. The afterflame time is recorded after the first flame application and the afterflame and afterglow times are recorded after the second flame application for each specimen. Information is also recorded on whether or not flaming material drips from the specimen (and whether these drips ignite a cotton indicator) and total flame time for a particular specimen set.

2. Standard Test Method for Measuring the Comparative Burning Characteristics and Resistance to Burn-Through of Solid Plastics Using a 125-mm Flame, ASTM D 5048-03, American Society for Testing and Materials, West Conshohocken, Pa. IEC 60695-11-20 and UL 94 5V for bar specimens are equivalent. In Procedure A of this test, sets of 13 by 125-mm bar specimens are subjected to a 125-mm flame with a 40-mm inner blue cone for five consecutive, 5-s flame applications. The afterflame plus afterglow time for the bar specimen is recorded after removal of the fifth flame application. Information is recorded on whether or not flaming material drips from the specimens.

Procedures

ASTM D 3801: Five specimens having weight and dimensions listed in Table D1 were cut from the plaque and conditioned to temperature 23 C+/−2 C for 48 hours prior to testing and tested within 30 minutes of removal from chamber. For testing, each specimen was suspended vertically from the clamped upper 6-mm of the specimen, with a distance of 300-mm from bottom edge of specimen to cotton surface, 100% cotton measuring 50×50×6-mm. A blue, premixed methane-air flame measuring 20-mm in height was obtained using a Bunsen burner. The flame was applied to the center of the bottom edge of specimen, with the top of the burner held 10-mm from to the bottom edge of specimen. The burner flame orientation faces the front of the specimen (13-mm width) and is held at 45 degrees to the vertical direction allowing dripping. As specimen degradation occurs, the burner maintains 45 degrees while maintaining the 10-mm distance. The burner was moved 150-mm away from specimen between impingements. The test is conducted by applying the burner flame to the specimen for 10 seconds then immediately removing flame and recording the afterflame and afterglow. This procedure is repeated a second time, for a total of 2 flame applications. Table D2 shows the criteria for vertical classification according to ASTM D 3801.

TABLE D2

ASTM D 5048 V-0, V-1, V-2 Materials Classifications

| Criteria Conditions | V-0 | V-1 | V-2 |
| --- | --- | --- | --- |
| Afterflame time for each individual specimen t1 or t2 | ≤10 s | ≤30 s | ≤30 s |
| Total afterflame time for any condition set (t1 plus t2 for the 5 specimens) | ≤50 s | ≤250 s | ≤250 s |
| Afterflame plus afterglow time for each individual specimen after the second flame application (t2 + t3) | ≤30 s | ≤60 s | ≤60 s |
| Afterflame or afterglow of any specimen up to the clamp | No | No | No |
| Cotton indicator ignited by flaming particles or drops | No | No | Yes |

ASTM D 5048:

Because the specimens burned very little in the ASTM D 3801 test, and due to the limited amount of material available, the ASTM D 3801 specimens were wiped with acetone and allowed to dry at room temperature and retested at the opposite end according to ASTM D 5048. For testing, each specimen was suspended vertically from the clamped upper 6-mm of the specimen, with a distance of 300-mm from bottom edge of specimen to cotton surface, 100% cotton measuring 50×50×6-mm. A blue flame measuring 125-mm high with a blue inner cone of 40-mm was obtained by mixing methane and air. The tip of the blue cone of the flame was applied to the bottom narrow edge of specimen. The burner flame orientation faces the narrow (3 mm width) edge of the specimen held by hand at 20 degrees to the vertical plane to allow dripping. As specimen degradation occurs, burner maintains 20 degrees while maintaining the 40-mm distance. Burner was moved 150-mm away from specimen between 5 second impingements. The test method begins with specimen flame exposure for 5 seconds then immediately removing flame for 5 seconds, then repeating 4 additional times. After the exposure to the burner, the afterflame was recorded and the afterglow time was recorded. Table D3 shows the criteria for vertical classification according to ASTM D 5048.

TABLE D3

ASTM D 5048 Material Classifications

| Criteria Conditions | 5VA | 5VB |
| --- | --- | --- |
| Individual bar specimen afterflame plus afterglow time after the fifth flame application (s) | <60 | <60 |
| Was the cotton indicator ignited by flaming particles or drops from any bar specimen? | No | No |
| Did the flame penetrate through any of the individual plaques? | N/A | N/A |

Results

Figure 6:
FIG. 6 shows certain exemplary test specimens.

FIG. 6 shows the test specimens after testing according to ASTM D 3801 testing (top) and ASTM D 5048 (bottom). Charring is limited to the portion of the specimen immersed m the flame during the test, as there was no visible flame spread after removal from the burner flame in either the ASTM D3801 or 5048 tests. Table D4 contains the results of the ASTM D 3801 testing. Table D5 contains the UL 94 rating criteria for the test, showing that the BHDB/BPA polyarylate obtained a V-0 rating.

TABLE D4

ASTM D 3801 Test Results For BHDB/BPA Polyarylate

| Specimen No. | t1 (s) | t2 (s) | t3 (s) | Cotton Ignited? | Mass Loss (g) |
|---|---|---|---|---|---|
| 1 | 1 | 2 | <1 | No | <1 |
| 2 | 1 | 4 | <1 | No | <1 |
| 3 | 1 | 3 | <1 | No | <1 |
| 4 | 1 | 3 | <1 | No | 1 |
| 5 | 1 | 2 | <1 | No | <1 |
| Total (t1 + t2) | 19 | | | | |

TABLE D5

ASTM D 5048 Test Results

| Specimen No. | Afterflame Time (s) | Afterglow time (s) | Cotton Ignited? | Mass Loss (g) |
|---|---|---|---|---|
| 1 | 9 | <1 | No | 1 |
| 2 | 17 | <1 | No | 3 |
| 3 | 9 | <1 | No | 2 |
| 4 | 8 | <1 | No | 1 |
| 5 | 15 | <1 | No | 2 |

The above examples showed that non-halogen BHDB/BPA polymers exhibit self-extinguishing characteristics and ratings of V-0 and 5VA when tested according to ASTM D 3801 and ASTM D 5048, respectively.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples herein and the references to the scientific and patent literature cited herein. The examples contain important additional information, exemplification and guidance which can be adapted to the practice of this invention in its various embodiments and equivalents thereof.

What is claimed is:

1. A polymer comprising a structural repeating unit having the structure of:

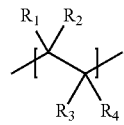

I wherein each of $R_1$, $R_2$, and $R_3$ is independently selected from hydrogen, un-substituted or substituted alkyl, and aryl groups and $R_4$ is

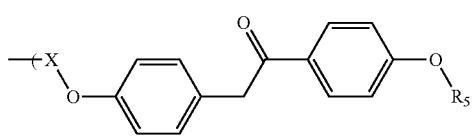

III wherein X is a unsubstituted or substituted bivalent alkyl or aryl group, and $R_5$ is a hydrogen, substituted or un-substituted alkyl or aryl group.

2. A co-polymer comprising a first structural repeating unit having the structure of:

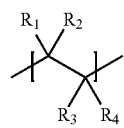

I wherein each of $R_1$, $R_2$, $R_3$ and $R_4$ is independently selected from hydrogen, un-substituted or substituted alkyl, and aryl groups, provided that at least one of $R_1$, $R_2$, $R_3$ and $R_4$ comprises a deoxybenzoin moiety having the structure of:

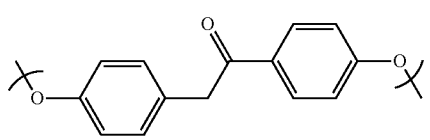

II and a second structural repeating unit having the structure of

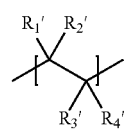

wherein each of $R_{1'}$, $R_{2'}$, $R_{3'}$ and $R_{4'}$ is independently selected from hydrogen, un-substituted or substituted alkyl, and aryl groups.

3. A polymer comprising a structural repeating unit having the structure of:

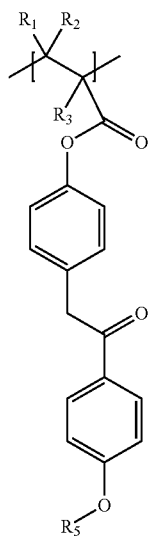

wherein each of $R_1$, $R_2$, $R_3$, and $R_5$ is independently selected from hydrogen, un-substituted or substituted alkyl, and aryl groups.

4. The polymer of claim 1, comprising a structural repeating unit having the structure of:

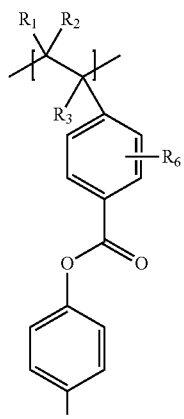

-continued

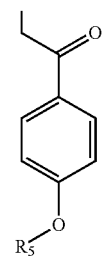

wherein each of $R_1$, $R_2$, $R_3$, and $R_5$ is independently selected from hydrogen, un-substituted or substituted alkyl, and aryl groups, and $R_6$ is a —OH, or substituted or un-substituted alkyl group.

5. The polymer of claim 4, further comprising a structural repeating unit having the structure of:

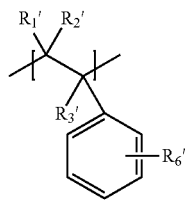

wherein each of $R_{1'}$, $R_{2'}$, and $R_{3'}$ is independently selected from hydrogen, un-substituted or substituted alkyl, and aryl groups, and $R_{6'}$ is one or more of —OH, or substituted or un-substituted alkyl groups.

6. The polymer of claim 2, wherein the copolymer is a star-shaped copolymer.

\* \* \* \* \*